(12) United States Patent
Kohda et al.

(10) Patent No.: US 7,136,853 B1
(45) Date of Patent: Nov. 14, 2006

(54) INFORMATION RETRIEVING APPARATUS AND SYSTEM FOR DISPLAYING INFORMATION WITH INCORPORATED ADVERTISING INFORMATION

(75) Inventors: Youji Kohda, Kawasaki (JP); Susumu Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/708,981

(22) Filed: Sep. 6, 1996

(30) Foreign Application Priority Data

Sep. 7, 1995 (JP) .................................. 7-229902
Mar. 14, 1996 (JP) .................................. 8-057217

(51) Int. Cl.
G06F 17/30 (2006.01)

(52) U.S. Cl. .................................. 707/6; 707/10; 707/1

(58) Field of Classification Search .................. 707/10, 707/104, 3; 395/701, 702, 703; 705/14, 705/27, 10; 340/286.01; 348/9; 709/206; 370/229; 330/4; 345/327
See application file for complete search history.

(56) References Cited

U.S. PATENT DOCUMENTS

| | | | | |
|---|---|---|---|---|
| 5,264,822 A | * | 11/1993 | Vogelman et al. | 340/286.01 |
| 5,740,549 A | * | 4/1998 | Reilly et al. | 705/14 |
| 5,752,238 A | * | 5/1998 | Dedrick | 705/14 |
| 5,774,170 A | * | 6/1998 | Hite et al. | 348/9 |
| 5,799,184 A | * | 8/1998 | Fulton et al. | 707/3 |
| 5,838,790 A | * | 11/1998 | McAuliffe et al. | 380/4 |
| 5,848,396 A | * | 12/1998 | Gerace | 705/10 |
| 5,907,321 A | * | 5/1999 | Grossman et al. | 345/327 |
| 5,913,040 A | * | 6/1999 | Rakavy et al. | 370/229 |
| 5,918,214 A | * | 6/1999 | Perkowski | 705/27 |
| 5,931,901 A | * | 8/1999 | Wolfe et al. | 709/206 |
| 5,933,811 A | * | 8/1999 | Angles et al. | 705/14 |
| 6,185,556 B1 | * | 2/2001 | Snodgrass et al. | 707/3 |

FOREIGN PATENT DOCUMENTS

| | | |
|---|---|---|
| JP | 4-127370 | 4/1992 |
| JP | 05143653 A | 6/1993 |
| JP | 06044301 A | 2/1994 |

OTHER PUBLICATIONS

Kentaro Fujimoto, "An Information Superhighway Prototype the Present State of Business Usage of the Internet and Suggestions for an Open Experiment" Nomura Search, vol. 15, No. 10, Oct. 5, 1994, pp. 38-41.
Prior Art Information List.

* cited by examiner

Primary Examiner—Christian P. Chase
Assistant Examiner—Neveen Abel-Jalil
(74) Attorney, Agent, or Firm—Staas & Halsey LLP

(57) ABSTRACT

The information retrieving apparatus according to the present invention obtains required information through the Internet. It comprises an input/output unit for inputting first data for use in obtaining retrieved information through the information communications network and second data for use in obtaining advertising information through the information communications network; a retrieved information obtaining unit for obtaining the retrieved information from the retrieving server connected to the information communications network using the first data; an additional information obtaining unit for obtaining the advertising information from a predetermined information server connected to the information communications network using the second data; and an information converting unit for incorporating the advertising information obtained by the additional information obtaining unit into the retrieved information obtained by the additional information obtaining unit. The first and second information combined by the information converting unit are displayed by the input/output unit on a display unit.

29 Claims, 27 Drawing Sheets

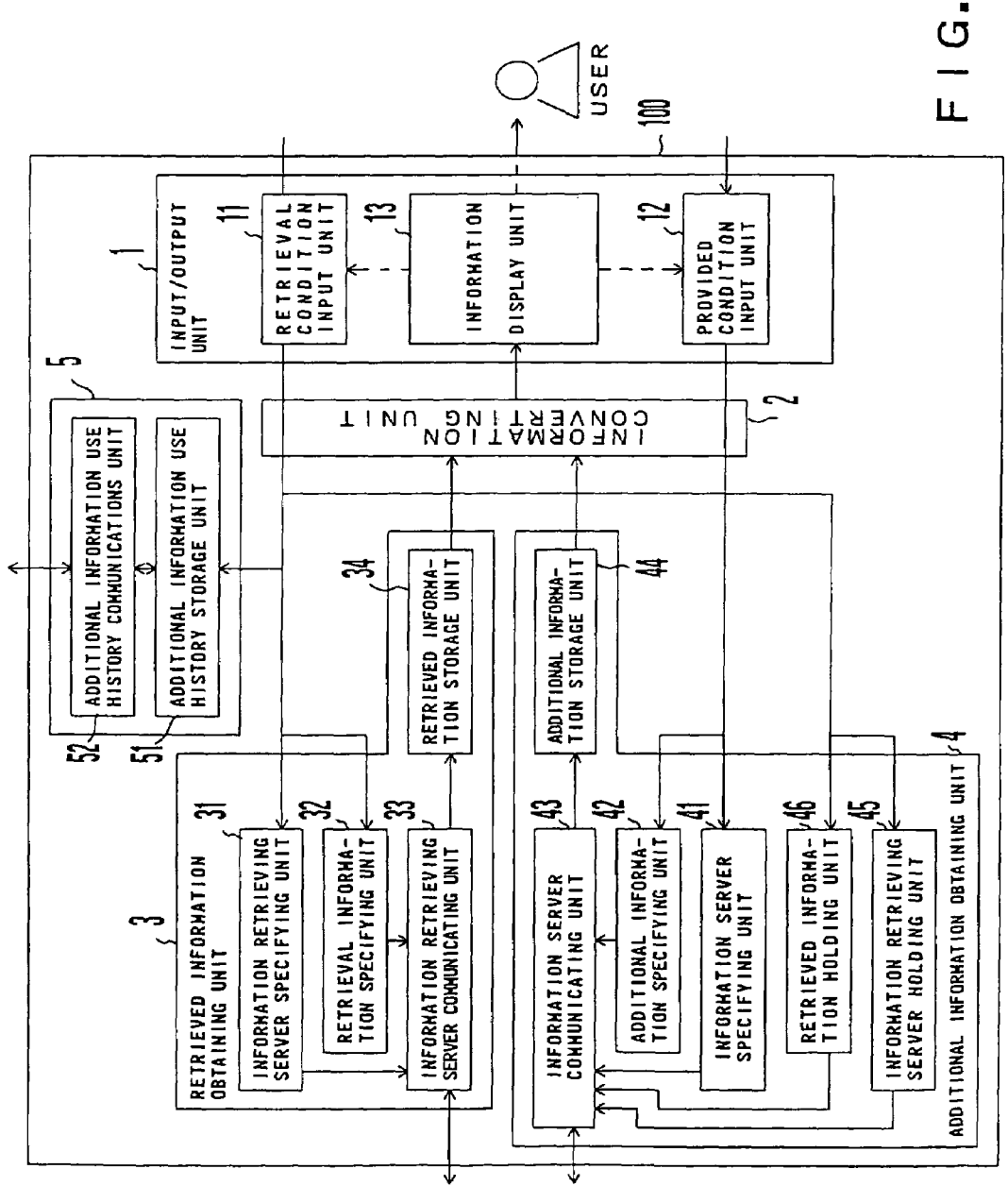
F I G. 1 2

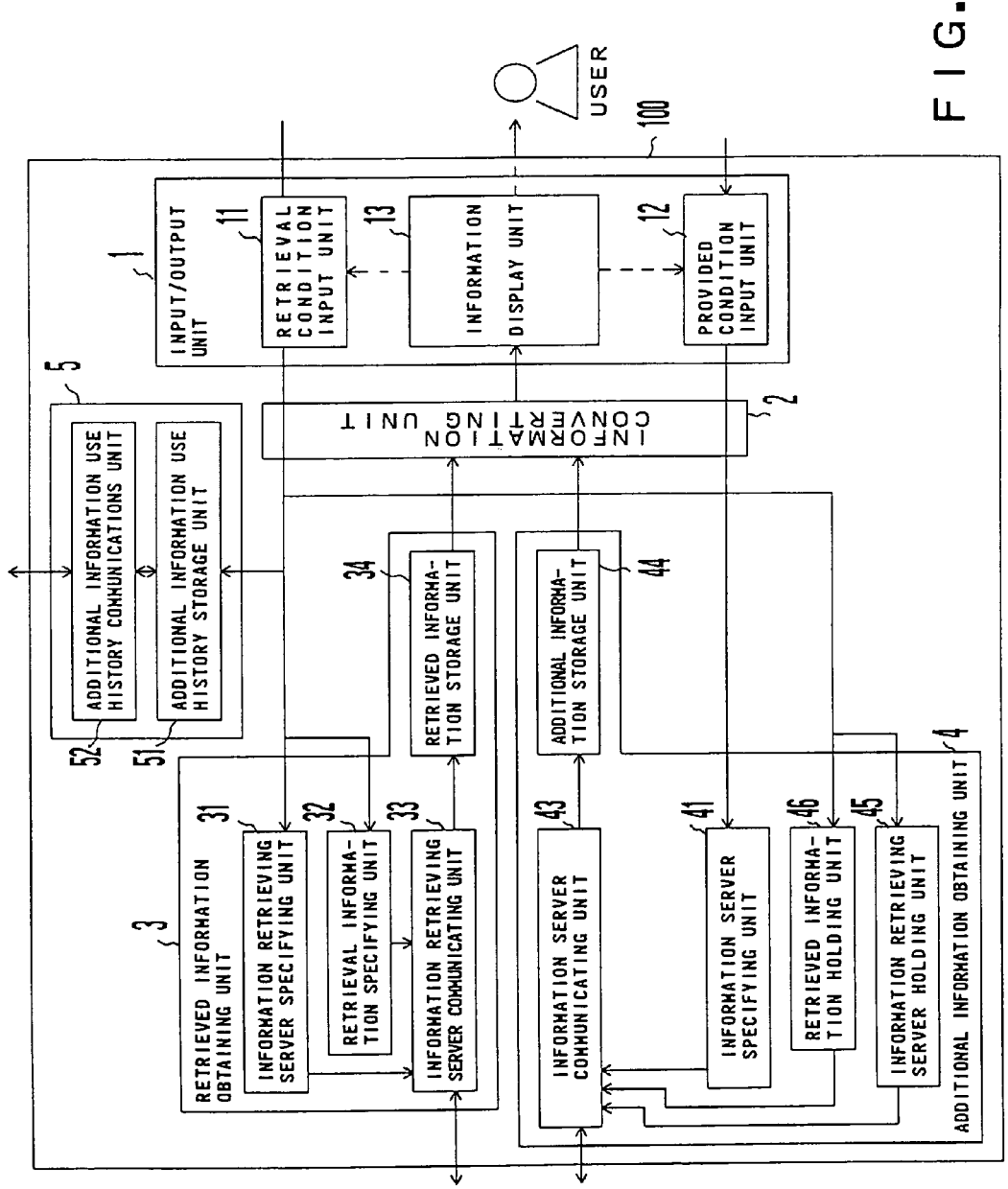
F I G. 22

INFORMATION RETRIEVING APPARATUS AND SYSTEM FOR DISPLAYING INFORMATION WITH INCORPORATED ADVERTISING INFORMATION

BACKGROUND OF THE INVENTION

1. Field of the Invention

The present invention relates to an information retrieving apparatus and an information retrieving system using the information retrieving apparatus, and more specifically to an information retrieving apparatus and an information retrieving system using the information retrieving apparatus for automatically retrieving prepared information such as advertising information from an information server and incorporating it into retrieved information when the retrieved information is obtained from an information retrieving server.

2. Description of the Related Art

With the development of computer networks and communication technology, the information from a number of information servers located all over the world can be optionally retrieved. A typical information retrieving system can be the world wide web (WWW) through the Internet. Well-known information retrieving apparatuses (information retrieving browser) of the WWW are Mosaic, Netscape, etc.

At present, information is provided through the Internet free of charge. However, a fee will be charged for each piece of useful information in the future. It is considered, in such cases, that the present advertising systems for newspapers and TV should apply to the WWW. That is, the present newspaper fee can be reduced by advertising products in newspapers, and in return receiving advertising fees from advertisers, and assigning the received fees as a portion of the issuing expenses. Thus, the fee for the information may be reduced by applying this advertising system to the WWW.

When the advertising system applies to the WWW as described above, the following method can be adopted. That is, each of the information servers stores object information together with associated advertising information. The user specifies desired information and requests the WWW to retrieve it. When the WWW accesses the information server at the retrieval request, the information server returns the retrieval result together with an associated advertisement. Thus, the user obtains the desired information and an advertisement.

However, according to such a method, there is the problem that an advertisement cannot be provided for the user unless the user accesses an information server storing advertising information. Although this problem is not at all serious with newspapers, it is a very serious problem with advertisements using the WWW. This depends on the differences in medium characteristics between a paper, etc. and the Internet.

The number of press companies and TV stations is limited, and a large number of readers and subscribers belong to each of them. Therefore, even if an advertisement is not provided until the user accesses an information provider, sufficient advertising effect can be expected. On the other hand, an enormous number of information servers exist in the WWW. Therefore, there is a tendency to centrally access a limited number of information servers. Under such a situation, a number of subscribers do not access a large number of information servers except for popular information servers. Accordingly, it is not expected that the large number of information servers obtain sufficient advertising effects.

According to the present advertising method, no advertising effect may be obtained in some cases. Therefore a large number of information servers, except for a few specific popular information servers, cannot attract advertisers, and the advertising system itself may not be maintained. Therefore, this advertising method cannot apply to advertisements through the WWW.

Also according to this advertising method, however, a predetermined advertisement is provided for a user and the user cannot optionally select a desired advertisement. This is not a serious problem with newspapers, etc., but it is a serious problem with advertisements through the WWW. This again refers to the differences in medium characteristics between newspapers and the Internet.

Newspapers simultaneously have a sufficiently large number of both readers and subscribers for each advertisement. Therefore, even if an advertisement is not required by a portion of users, it may be useful for a large number of other users and a sufficiently large advertising effect can be expected. On the other hand, a user of information through the WWW is normally a single user. That is, a large number of users do not simultaneously access the same information. Therefore, a provided advertisement does not always interest the receiving user, and no useful effects can be expected from the advertisement.

From the above described points, useful effects of advertisements may not be obtained according to the above described advertising method. As a result, advertisers may not be attracted, thereby causing the advertising system to be abandoned. Therefore, the above described advertising method cannot widely apply to advertisements through the WWW.

SUMMARY OF THE INVENTION

The present invention aims at providing an information retrieving apparatus for automatically obtaining additional information, and for incorporating it into retrieved information when the retrieved information is obtained.

The present invention also aims at providing an information retrieving apparatus for automatically obtaining additional information, for example, advertising information, from the information server (advertisement server), and for incorporating it into the retrieved information when the retrieved information is obtained from the information retrieving server (common information server).

The present invention also aims at providing an information retrieving apparatus for automatically obtaining additional information (advertising information), in which a user will be very interested, and for incorporating it into retrieved information when the retrieved information (common information) is obtained.

The present invention also aims at providing an information retrieving apparatus for automatically obtaining additional information, for example, advertising information, in which a user will be very interested, from the information server, and for incorporating it into the retrieved information when the retrieved information is obtained from the information retrieving server.

The present invention further aims at providing an information retrieving system for incorporating additional information such as advertising information into retrieved information and outputting the result on a display unit using an information retrieving apparatus for automatically obtaining the additional information when the retrieved information is obtained.

The present invention aims at providing an information retrieving apparatus and an information retrieving system for automatically obtaining additional information such as advertising information from an information server which is a WWW server, and for incorporating it into retrieved information when the retrieved information is obtained from the information retrieving server which is a WWW server on the Internet.

The present invention also aims at providing an information retrieving system for incorporating additional information such as advertising information in which a user will be very interested into retrieved information, and for outputting the result on a display unit using an information retrieving apparatus for automatically obtaining the additional information when the retrieved information is obtained, and using an information retrieving apparatus for providing, according to the retrieved information, the additional information in which a user will be very interested.

The present invention further aims at providing an information retrieving apparatus and an information retrieving system for automatically obtaining retrieved information from an information retrieving server which is a WWW server on the Internet, automatically obtaining based on the obtained retrieved information the additional information such as advertising information in which a user will be very interested from an information server which is a WWW server, and for incorporating the obtained information into the retrieved information when the information retrieving server obtains the retrieved information.

The information retrieving apparatus according to the present invention is for obtaining required information through an information communications network, and comprises an input unit (for example, an input/output unit in the embodiments) for inputting first data for use in obtaining first information (for example, retrieved information) through the information communications network and second data for use in obtaining second information (for example, advertising information) through the information communications network; a first information obtaining unit (for example, a retrieved information obtaining unit) for obtaining the first information from a first server (for example, a retrieving server) connected to the information communications network using the first data; a second information obtaining unit (for example, an additional information obtaining unit) for obtaining the second information from a predetermined second server (for example, an information server) connected to the information communications network using the second data; an information converting unit for incorporating the second information obtained by the second information-obtaining unit into the first information obtained by the first information obtaining unit; and a display unit (for example, an input/output unit) for displaying the first information and second information combined by the information converting unit.

The information providing apparatus according to the present invention is for providing information through an information communications network, and comprises an additional information storage unit (for example, an additional information database) for storing additional information (for example, advertising information); a retrieving unit (for example, a retrieving engine) for retrieving the additional information stored by the additional information storage unit; and an additional information transmitting unit for receiving additional information specifying data for use in specifying the additional information from the information retrieving apparatus through the information communications network and outputting the additional information retrieved by the retrieving unit according to the additional information specifying data to the information retrieving apparatus.

The information retrieving system is for communicating information through an information communications network, and comprises; an information retrieving server for providing predetermined information as retrieved information; an information server for providing advertising information; and an information retrieving apparatus for receiving the retrieved information and advertising information through the information communications network, obtaining the retrieved information from the information retrieving server, obtaining the advertising information from the information server which is a predetermined server, and incorporating the advertising information into the obtained retrieved information and displaying the resultant information.

The information retrieving method according to the present invention is used to obtain required information through an information communications network, and comprises the steps of obtaining the first information (for example, retrieved information) from a first server (for example, a retrieved information server) connected to the information communications network using the first data; obtaining second information (for example, advertising information) from a predetermined second server (for example, an information server) connected to the information communications network using the second data; incorporating the obtained second information into the obtained first information; and displaying the first information into which the second information is incorporated.

The information providing method according to the present invention is used to provide information through an information communications network, and comprises the steps of receiving the first information from a contract user through the information communications network; selecting a piece of advertising information from among plural pieces of stored advertising information according to the first information; and transmitting the selected advertising information to the user through the information communications network.

The information retrieving method according to the present invention is used to obtain required information through an information communications network, and comprises the steps of inputting first data to a first unit (for example, an information retrieving apparatus) connected to the information communications network; inputting second data to the first unit; requesting a second unit (for example, a retrieved information server) to provide the first information (for example, retrieved information) to a second unit (for example, a retrieved information server; requesting a third unit (for example, an advertising information server) connected to the information communications network to provide the second information (for example, advertising information) using the second data upon inputting the first data; transmitting upon receipt of the request from the first unit the first information from the second unit to the first unit; transmitting upon receipt of the request from the first unit the second information from the third unit to the first unit; incorporating the second information transmitted from the third unit into the first information transmitted from the second unit; and displaying on the first unit the first information into which the second information is incorporated.

The storage medium according to the present invention stores computer programs for performing the above described information retrieving method or information pro-

BRIEF DESCRIPTION OF THE DRAWINGS

FIG. 12 shows the configuration of the second embodiment of the information retrieving apparatus according to the present invention;

FIG. 22 shows the configuration of the third embodiment of the information retrieving apparatus according to the present invention;

DESCRIPTION OF THE PREFERRED EMBODIMENT

Figure 1:
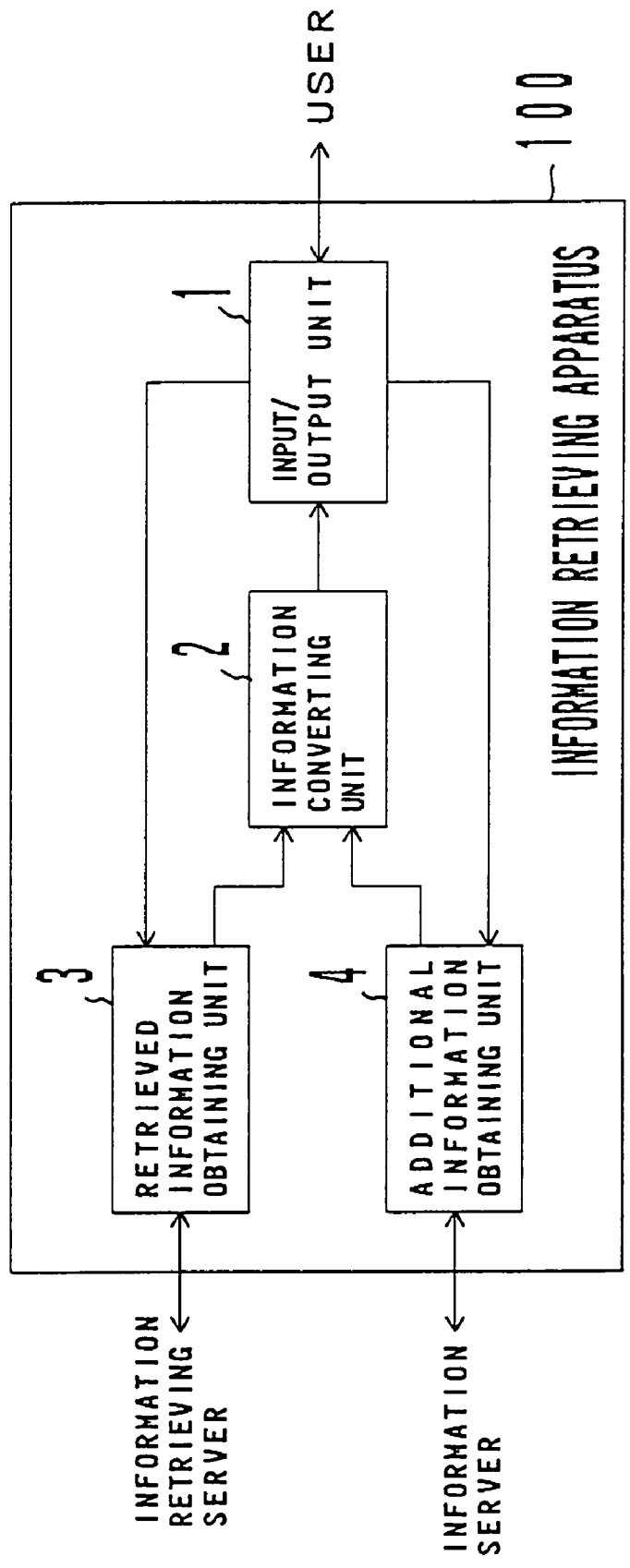
FIG. 1 shows the basic configuration of the information retrieving apparatus according to the present invention.

FIG. 1 is a block diagram showing the basic configuration of the information retrieving apparatus according to the present invention. As shown in FIG. 1, an information retrieving apparatus 100 comprises an input/output unit 1, an information converting unit 2, a retrieved information obtaining unit 3; and an additional information obtaining unit 4.

The input/output unit 1 receives data for use in obtaining retrieved information (common information) and additional information (advertising information) from the user, and outputs the retrieved information and additional information obtained from the server to the display unit. The retrieved information obtaining unit 3 communicates with an information retrieving server (common information server) external to the information retrieving apparatus 100 according to the data (retrieved information obtaining data) for use in obtaining the retrieved information input through the input/output unit 1, and obtains retrieved information from the information retrieving server. The additional information obtaining unit 4 communicates with an information server (advertising server) external to the information retrieving apparatus 100 according to the data (additional information obtaining data) for use in obtaining the additional information input through the input/output unit 1, and obtains object additional information from the information server. The information converting unit 2 incorporates the additional information obtained by the additional information obtaining unit 4 into the retrieved information obtained by the retrieved information obtaining unit 3, and outputs the resultant information to the input/output unit 1.

When retrieved information acquisition data is input to an input/output unit 1 in the information retrieving apparatus 100, the retrieved information obtaining unit 3 obtains object retrieved information from an information retrieving server according to corresponding retrieved information acquisition data. This triggers the additional information obtaining unit 4 into obtaining object additional information from an information server predetermined by additional information acquisition data input prior to the input of the retrieved information acquisition data. The additional information obtaining unit 4 then incorporates the obtained additional information into the retrieved information obtained by the information converting unit 2. The input/output unit 1 outputs and displays the result on the display unit.

According to the information retrieving apparatus 100, information is retrieved as follows. First, the user specifies useful or required additional information (for example, advertising information about personal computers) through the input/output unit 1. The information is input as data for use in obtaining the data to be provided. The data is stored by the additional information obtaining unit 4. The user inputs data for use in obtaining requested retrieved information (for example, articles from a newspaper relating to a specified item) through the input/output unit 1. Then, the information retrieving apparatus 100 obtains the retrieved information from the information retrieving server through the retrieved information obtaining unit 3, automatically obtains additional information such as advertising information from the information server through the additional information obtaining unit 4, incorporates the obtained information into the retrieved information obtained from the information converting unit 2, and outputs the result on a display unit.

When the user inputs data for use in obtaining desired retrieved information in the information retrieving apparatus 100, the retrieved information is obtained and the additional information is automatically retrieved. Then, the additional information is incorporated into the obtained retrieved information for output and display. Furthermore, with the information retrieving apparatus 100, the additional information such as advertising information useful to the users can be output by specifying an information server and the additional information.

Therefore, with the information retrieving system using the information retrieving apparatus 100, each of the information retrieving servers does not have to be provided with the additional information such as advertising information in addition to the retrieved information. That is, the process normally does not have to be completed at the server terminal, but the process can be performed at the terminal of the information retrieving apparatus 100 (at the terminal of a client) according to the user's request. Thus, advertising information can be transmitted to the user even if the user does not access a specified information retrieving server. Since the advertising information is preliminarily selected by the user, it is useful to the user. Thus, according to the present invention, the effect of an advertisement can be realized regardless of which information retrieving server has been accessed. Therefore, the effect of an advertisement can be obtained even if access is concentrated on a specific information retrieving server.

The information retrieving apparatus 100 can be widely applied to, for example, advertisements through the WWW. That is, sufficient advertising effect can be gained even when access is concentrated on a very small number of popular information retrieving servers, and a large number of other information retrieving servers are rarely accessed. Therefore, a sufficient number of advertisers can be collected. In the WWW, information users are individuals and there are not a large number of users concentrated in one accessing operation. However, since the advertising information has been preliminarily selected by the user, the user is interested in the provided advertisement in most cases. Accordingly, sufficient advertising effect can be obtained. Thus, the conventional advertising system can apply to the WWW according to the present invention, and information fees can be successfully reduced.

Figure 2:
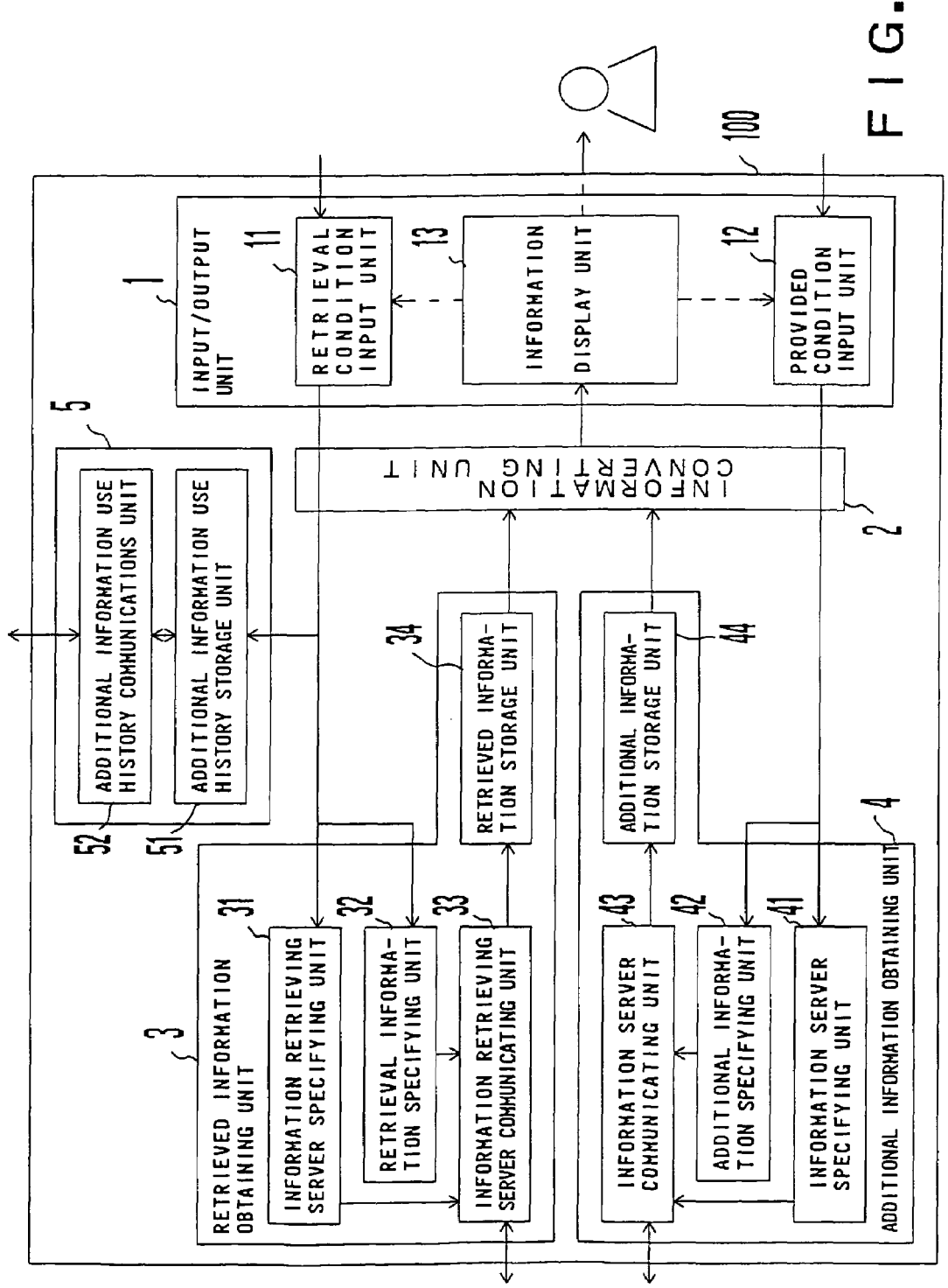
FIG. 2 shows the configuration showing the first embodiment of the information retrieving apparatus according to the present invention.

FIG. 2 shows the configuration of the information retrieving apparatus 100 according to the first embodiment. The information retrieving apparatus 100 comprises the input/output unit 1, information converting unit 2, retrieved information obtaining unit 3, additional information obtaining unit 4, and an additional information use history management unit 5.

The embodiment is an example of an advertising system in which the information retrieving apparatus 100 is applied to the WWW through the Internet, and advertising information is obtained as additional information to be incorporated into retrieved information. The information retrieving apparatus 100 is a single independent data processing unit, and is connected to an integral computer network such as the Internet as shown in FIG. 3.

Figure 3:
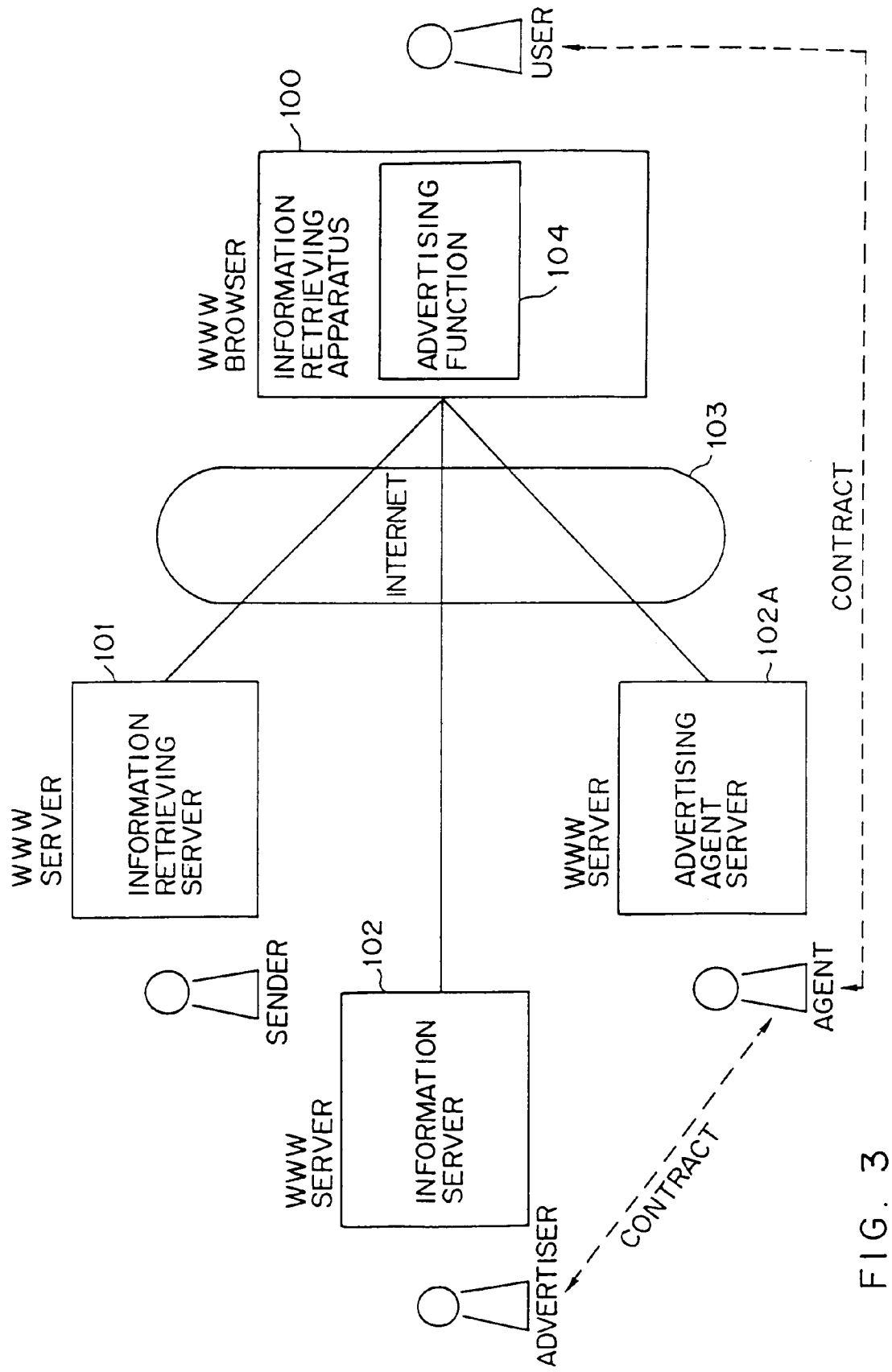
FIG. 3 shows the information retrieving system using the information retrieving apparatus according to the present invention.

FIG. 3 shows an advertising system and information retrieving system in which the present invention is applied to the WWW through the Internet.

As shown in FIG. 3, the information retrieving apparatus 100 is connected to an information retrieving server 101 and information server 102 through the Internet 103 for communication with them. The information retrieving apparatus 100 is an information retrieving browser (WWW browser) in the WWW, and the information retrieving server 101 and information server 102 are servers (WWW servers) in the WWW.

The information retrieving apparatus 100 designates object information and requests the information retrieving server 101, which manages information to be referred to, to retrieve the information, and obtains the information. The information is hereinafter referred to as retrieved information. In this specification, the retrieved information refers to the primary information which the user has requested to obtain (refer to), externally to the information retrieving apparatus 100.

The information (retrieved information) managed by a sender and externally referred to is managed in the information retrieving server 101. The retrieved information is free of charge in the present Internet service. In consideration of the possibility of information fees in the future, it is assumed that a fee is charged for information. The information is designated by the user by, for example, referring to a home page of the information retrieving server 101.

The information retrieving apparatus 100 obtains retrieved information and simultaneously requests the information server 102, that is, a WWW server preliminarily specified by the user, to retrieve information preliminarily and automatically specified by the user. Thus, the user obtains the desired information. The information is hereinafter referred to as additional information. In this specification, additional information refers to information different from the above described retrieved information, and is secondary information added to the information requested by the user (retrieved information). It is obtained externally to the information retrieving apparatus 100, and is information other than the retrieved information.

Therefore, the additional information is automatically obtained each time the retrieved information is obtained. In this embodiment, the additional information is advertising information. Advertising information refers to, for example, information for advertising a product or service put on sale by an advertiser. Additional information such as advertising information the advertiser requests to advertise is managed in the information server 102. It is obvious that the additional information can be externally referred to. An advertising agent server 102A is described later.

As shown in FIG. 3, the information retrieving apparatus 100 comprises an advertising function 104. The advertising function 104 is mainly realized by the input/output unit 1 (especially a providing condition input unit 12 and an information display unit 13 described later), additional information obtaining unit 4, and information converting unit 2. The advertising function 104 incorporates obtained additional information into obtained retrieved information and outputs them. That is, object information is output after being provided with an advertisement. Therefore, the information retrieving apparatus 100 can be a WWW browser provided with the advertising function 104.

When a user obtains information by designating it through the information retrieving apparatus 100, the user is provided with the designated information (retrieved information) together with additional information as an output. Thus, the advertiser can expect an advertising effect. The information fee can be reduced by the advertiser's partial or complete burden of the network fee and reference fee for the retrieved information, etc. (hereinafter referred to as the information fee).

The information retrieving apparatus 100 is a single independent data processing unit as described above, and comprises a CPU, a memory, a program in the memory, an input/output unit, a communications unit, etc. The input/output unit 1 comprises an input/output device, its control program, etc. The information converting unit 2 comprises a CPU, a memory, an information converting program in the memory, etc. The retrieved information obtaining unit 3, additional information obtaining unit 4, and additional information use history management unit 5 comprise a CPU, a memory, a retrieved information obtaining program, an additional information obtaining program, and an additional information history management program in the memory, a communications unit for communicating with external devices, etc.

As shown in FIG. 2, the input/output unit 1 comprises a retrieval condition input unit 11, providing a condition input unit 12, and an information display unit 13.

The retrieval condition input unit 11 is used to input data when a user requests to retrieve data and obtains retrieved information. It comprises, for example, a pointing device (a selecting device) such as a mouse, etc.

The data required to obtain retrieved information comprises the data designating the information retrieving server 101 and the data designating the retrieved information. In the WWW in the Internet, the user displays a home page of the information retrieving server 101 on the screen of the information display unit 13, and selects using the mouse, etc. for the desired information. Thus, the data required to obtain the retrieved information is input to the retrieval condition input unit 11 by designating a portion of the information (selected by the mouse) displayed on the information display unit 13. As is well-known, the data required to obtain the retrieved information is not displayed on the information display unit 13, but only the information corresponding to the data is displayed. The retrieval condition input unit 11 transmits the input retrieve request and corresponding data to the retrieved information obtaining unit 3.

The retrieval condition input unit 11 can be a text input device such as a keyboard, etc. In this case, the user inputs the data to the retrieval condition input unit 11 by directly inputting the data using a keyboard, etc.

The providing condition input unit 12 is used by the user to input data required to obtain additional information. For example, it comprises a pointing device such as a mouse, etc. The providing condition input unit 12 is the same as the retrieval condition input unit 11 in items of hardware. Therefore, it can be a text input device such as a keyboard, etc.

The data required to obtain additional information comprises data designating the information server 102 and the data designating the additional information. The data required to obtain additional information is input prior to the input of the data required to obtain retrieved information. Thus, the additional information can be automatically obtained each time the retrieved information is obtained.

The data required to obtain additional information is input as follows. That is, the user displays on the information display unit 13 the page relating to the additional information through the home page of the advertising agent server 102A shown in FIG. 3. Then, the user selects using the mouse, etc. for the desired information (for example, information about a new personal computer from a specific manufacturer). Thus, the data required to obtain additional information is copied from (the memory for the display) the screen of the information display unit 13, and input to the providing condition input unit 12. The provided condition input unit 12 transmits the input data to the additional information obtaining unit 4. The user can be informed of the latest sales condition of personal computers each time retrieved information is obtained. It is interesting information for the user, and the advertiser can expect an advertising effect by providing the information to the user.

As a result, the advertising agent server 102A shown in FIG. 3 generates a list of additional information (advertising information) and discount rates, etc. as a page relating to the additional information, and provides them to the information retrieving apparatus 100. In the WWW through the Internet, the home pages of the advertising agent server 102A and information retrieving server 101 are processed equally without distinction.

As described above, the advertising system comprises the advertising agent server 102A in addition to the information server 102. The advertising agent server 102A can be a substitute for the information server 102 for transmitting to the user the additional information, that is, advertising information. There are a plurality of advertising agent servers 102A each of which generates a page relating to the additional information provided by a corresponding advertiser (information server 102). Each of the pages is provided to the information retrieving apparatus 100. The information server 102 can also function as advertising agent server 102A. A so-called provider can also function as advertising agent server 102A.

In the advertising system, the user contracts with an advertising agent by accessing the advertising agent server 102A through the information retrieving apparatus 100 to have the advertising agent undertake to pay the information fee which should fundamentally be paid by the user. In return, the advertising information of the advertiser who has contracted with the advertising agent is displayed on the user's display screen. On the other hand, the advertiser accesses the advertising agent server 102A through the information server 102 to contract with the advertising agent. Through the contract, the advertising agent displays the advertising information of the advertiser on the user's display screen, and the advertiser pays a predetermined fee to the advertising agent. Therefore, the information fee to be paid by the user should be paid by the advertising agent, but is actually paid by the advertiser.

Through the advertising agent server 102A, the user can avoid the trouble of individually contracting with each advertiser, and has the information fee paid by the advertising agent server 102A. The user can contract with a plurality of advertising agent servers 102A, and can select additional information from a wide selection. On the other hand, through the advertising agent server 102A, the advertiser can avoid the trouble of individually contracting with a number of users when providing additional information to the users, or avoid the trouble of generating interesting home pages and preparing for sales promotions for successfully contracting with a larger number of users. The advertiser may contract with a plurality of advertising agent servers 102A or discard the contracts based on the use history, etc. about the additional information, described later.

In FIG. 2, the information display unit 13 displays and outputs to the user a home page of the information retrieving server 101, a page relating to the additional information of the advertising agent server 102A, the obtained retrieved information, additional information, etc. For example, the information displaying unit 13 comprises a display device such as a CRT, etc. The information display unit 13 receives information to be displayed from the information converting unit 2.

The retrieved information obtaining unit 3 comprises a information retrieving server specifying unit 31, a retrieval information specifying unit 32, an information retrieving server communicating unit 33, and a retrieved information storage unit 34.

When the retrieved information obtaining unit 3 receives a retrieval request from the retrieval condition input unit 11 of the input/output unit 1, the information retrieving server specifying unit 31 stores data specifying the information retrieving server 101. The information retrieving server specifying unit 31 specifies the information retrieving server 101 according to the stored data, and informs the information retrieving server communicating unit 33 of the specification. According to the specification, the information retrieving server communicating unit 33 performs communications, and the contents of the information retrieving server specifying unit 31 are reset.

When the retrieved information obtaining unit 3 receives a retrieval request from the retrieval condition input unit 11 of the input/output unit 1, the retrieval information specifying unit 32 stores data specifying retrieval information. The retrieval information specifying unit 32 specifies the information to be retrieved according to the stored data, and informs the information retrieving server communicating unit 33 of the specification. According to the specification, the information retrieving server communicating unit 33 performs communications, and the contents of the retrieval information specifying unit 32 are reset.

When the two pieces of data are stored, the information retrieving server communicating unit 33 communicates with the information retrieving server 101 according to the specification by the information retrieving server specifying unit 31 under the control of the retrieved information obtaining unit 3. Then, the information retrieving server communicating unit 33 requests the information retrieving server 101 to retrieve the information according to the specification by the retrieval information specifying unit 32 and obtains the retrieved information. The information retrieving server communicating unit 33 stores the obtained retrieved information in the retrieved information storage unit 34. The retrieved information storage unit 34 comprises a memory.

The retrieved information is obtained only after a retrieval request is input to the information retrieving apparatus 100 by the user. That is, the retrieval request, which is a trigger for obtaining the retrieved information, is input by the user to the information retrieving apparatus 100. The information retrieving server 101, which is communicating, can be determined each time communications are set, and the contents of retrieved information 106 shown in FIG. 4 can also be determined each time communications are set. That is, the contents of the retrieved information are specified each time a retrieval request is issued.

They are retrieved when a retrieval request is issued in a common. WWW through the Internet. Therefore, the user does not have to be aware of receiving additional information nor to pay any fee for a retrieval request.

The additional information obtaining unit 4 comprises an additional information server specifying 41, an additional information specifying unit 42, an information server communicating unit 43, and an additional information storage unit 44.

When the additional information obtaining unit 4 receives the data from the provided condition input unit 12 of the input/output unit 1, the information server specifying unit 41 stores the data specifying the information server 102 in the data. The data is held in the information server specifying unit 41 until the next new data specifying the information server 102 is input, and is updated when the next data is input. The information server specifying unit 41 specifies the information server 102 according to the stored data and informs the information server communicating unit 43 of the specification.

When the additional information obtaining unit 4 receives the data from the provided condition input unit 12 of the input/output unit 1, the additional information specifying unit 42 stores the data specifying the additional information in the data. The data is held in the additional information specifying unit 42 until the next new data specifying the additional information is input, and is updated when the next data is input. The additional information specifying unit 42 specifies the information to be obtained according to the stored data and informs the information server communicating unit 43 of the specification.

The information server communicating unit 43 communicates with the information server 102 according to the specification by the information server specifying unit 41 under the control of the additional information obtaining unit 4. Then, the information server communicating unit 43 requests the information server 102 to retrieve the information according to the specification by the additional information specifying unit 42 and obtains the additional information. The information server communicating unit 43 stores the obtained additional information in the additional information storage unit 44. The additional information storage unit 44 comprises a memory.

The additional information is automatically obtained only after a retrieval request is input to the information retrieving apparatus 100 by the user. That is, the retrieval request issued to the information server 102 which is a trigger for obtaining the retrieved information is not input by the user to the information retrieving apparatus 100, but automatically issued by the additional information obtaining unit 4. The information server 102, which is communicating, is predetermined, and the contents of the obtained additional information are also predetermined each time communications are set. That is, a communicator and the contents of the additional information are predetermined according to the user.

To automatically respond to a request, the input/output unit 1 or the retrieved information obtaining unit 3 notifies the additional information obtaining unit 4 that retrieved information has been or will be obtained at a retrieval request of the user. For example, the input/output unit 1 notifies that the user has input a retrieval request, or that the retrieved information obtaining unit 3 accesses the information retrieving server 101 to obtain the retrieved information or that it accessed the information retrieving server 101 and obtained the retrieved information. Under the control of the additional information obtaining unit 4 that has received the notification, the information server communicating unit 43 communicates with the information server 102.

The data specifying the information server 102 and the data specifying additional information, that is, the contents of the information server specifying unit 41 and additional information specifying unit 42, can be optionally updated (at the request of a user). The user optionally displays a page describing the additional information of the advertising agent server 102A on the information display unit 13, and selects using the mouse, etc. for the desired additional information. Thus, data required to obtain additional information is updated.

The user is informed of additional information, for example, the latest sales conditions of personal computers. If the user is discontented with the information, the data is updated such that the same type of the additional information in another information server 102 is specified. After the user is informed of additional information, for example, about personal computers, the user updates the data such that other interesting additional information, for example, about automobiles, can be specified. Furthermore, the user contracts with another advertising agent server 102A, and updates the data such that the same type of additional information in the other information server 102 can be specified.

This indicates that the user has the right to select additional information, and is considerably advantageous in improving the use rate of the additional information (advertising information). It promotes the competition between the information server 102 and advertising agent server 102A. That is, the information server 102 and advertising agent server 102A are requested to attempt to enhance the use rate of the additional information (advertising information) managed by the respective servers. This increases the reliability and correctness of the additional information, the discount rate for fees, etc.

The information retrieving server communicating unit 33 and information server communicating unit 43 comprise the same communications devices. An additional information use history communications unit 52 described later also comprises the same communications device. For example, a program in the memory forming part of the retrieved information obtaining unit 3 instructs a communications device that is the information retrieving server communicating unit 33 to make predetermined communications using a value stored by the information retrieving server specifying unit 31 and retrieval information specifying unit 32 which are defined areas in the memory. Similar instructions are issued to other units. According to the present embodiment, after the retrieved information obtaining unit 3 has obtained retrieved information through its communications device, the additional information obtaining unit 4 obtains the additional information to be incorporated through its communications device.

The information converting unit 2 incorporates the additional information stored by the additional information storage unit 44 into the retrieved information stored by the retrieved information storage unit 34. Practically, the information converting unit 2 reads the additional information after the additional information has been stored by the additional information storage unit 44, and stores the additional information in a predetermined memory. Then, it reads the retrieved information stored by the retrieved information storage unit 34 and develops it in the area following the area in which the additional information has been developed in the predetermined memory. The information converting unit 2 transmits the information after the above described incorporating process (referred to as updated information) to the information display unit 13 as a response to an input of a retrieval request from the retrieval condition input unit 11.

The additional information is not always incorporated before the retrieved information, but can be incorporated after or in the middle of the retrieved information. The additional information may only be displayed on the information display unit 13 as associated in any format with the corresponding retrieved information, and other type of incorporating format may be used.

After the information display unit 13 has received the updated information from the information converting unit 2, it stores the information in its memory for display, and displays it as a response to a retrieval request from the user.

Then, the user obtains the retrieved information desired for reference, and also obtains the additional information (advertising information) specified by the user as interesting information.

As described above, additional information is automatically obtained mainly by the input/output unit 1, additional information obtaining unit 4, and information converting unit 2, at a request to retrieve information, and is added to the retrieved information and the result is output, (advertising function 104). To improve the advertising function 104, an additional information use history management unit 5 is provided in the present embodiment. The additional information use history management unit 5 comprises an additional information use history storage unit 51 and the additional information use history communications unit 52.

The additional information use history storage unit 51 stores an actual use history of the user corresponding to the additional information. That is, the additional information use history storage unit 51 stores a private history in its memory if the data required to obtain retrieved information from the retrieval condition input unit 11 is in the additional information (copied from the additional information).

The history of the uses to be recorded stores a user name, time and frequency of uses. The object data is copied in the retrieval condition input unit 11, and contains the name of the information server 102 and contents of the additional information. A user refers to a user name or the name of the information retrieving apparatus 100. The time of use refers to the date and time when the information is used. The frequency of uses refers to the number of times the information is used. Especially if the additional information is advertising information, it is also recorded whether or not the product in the advertisement has been purchased through the additional information.

To record the data, the additional information use history storage unit 51 checks whether or not the corresponding data has been obtained from the additional information. Practically, according to the additional information displayed on the information display unit 13, the data required to obtain information more concrete and detailed than additional information (hereinafter referred to as detailed information) is input by selecting using the mouse, etc. at a predetermined point (information) by the user. The user can be informed of detailed data about specifically interesting information in the additional information without accessing the information server 102. For example, when the additional information describes a new personal computer of a specific manufacturer, it can be obtained as the detailed information about the practical specification, appearance, etc. of a desired model. The information is instructive for the user, and is also useful for the advertiser because it improves an advertising effect for the product.

In such a case, the data required to obtain the detailed information about the additional information is obtained by copying from the additional information. That is, the data in the memory for display is obtained by copying to the retrieval condition input unit 11 so that the additional information can be displayed on the information display unit 13.

Accordingly, the data required to obtain the detailed information about the additional information is input to the retrieval condition input unit 11. The retrieval condition input unit 11 transmits the input data to the retrieved information obtaining unit 3. Thus, as described above, the detailed information about the additional information is obtained using the information retrieving server 101 as the WWW server for referring to the detailed information about the additional information, and displayed and output on the display unit.

Whether or not the data required to obtain retrieved information has been obtained using (by copying) the additional information can be determined by comparing the data with the data required to obtain the detailed information about the additional information. The data is input to the retrieval condition input unit 11. On the other hand, the data required to obtain the detailed information about the additional information is stored by the memory of the information converting unit 2. The comparison is made by the information converting unit 2, and therefore, the information converting unit 2 fetches the data transmitted from the retrieval condition input unit 11 to the retrieved information obtaining unit 3.

When the detailed information is obtained, the user has viewed the detailed information by checking the additional information. Accordingly, it is considered that the advertiser has obtained a successful advertising effect. As a result, the additional information use history storage unit 51 stores it.

According to the present embodiment, the output of the additional information is omitted when the detailed information about the additional information is displayed because the user has already viewed the additional information and it is a nuisance for the user who has already viewed detailed information to have the same additional information displayed again.

As a result, the additional information obtaining unit 4 omits obtaining the additional information. Therefore, the input/output unit 1 or retrieved information obtaining unit 3 omits notifying the additional information obtaining unit 4 of the acquisition of the retrieved information. Thus, the retrieved information obtaining unit 3 obtains the retrieved information by accessing the information retrieving server 101 without obtaining the additional information through the additional information obtaining unit 4.

The additional information use history communications unit 52 reads or writes the contents stored by the additional information use history storage unit 51. That is, when a request to read or write the additional information use history is issued from outside the information retrieving apparatus 100, that is, from the information server 102 or advertising agent server 102A, the additional information use history communications unit 52 reads or writes the contents of the additional information use history storage unit 51.

The additional information use history indicates as described above whether or not a successful advertising effect has been obtained. Therefore, the information server 102 or advertising agent server 102A refers to this indication to make the most of the additional information.

For example, when the additional information is used for a larger number of times in the additional information use history, such a service as increasing the discount rate for the information fee can be provided to the information retrieving apparatus 100. The service can be provided when the user purchases products using the additional information, particularly when the additional information is advertising information. In this case, the advertising agent server 102A receives a bonus from the advertiser for the successful sales. After providing such services, the number of times of use of the additional information is reset. That is, "0" is written to the additional information use history storage unit 51. The information server 102 or advertising agent server 102A reads the additional information use history at predetermined intervals to be informed of the tendency or liking of the user. That is, marketing research can be easily made.

Figure 4:
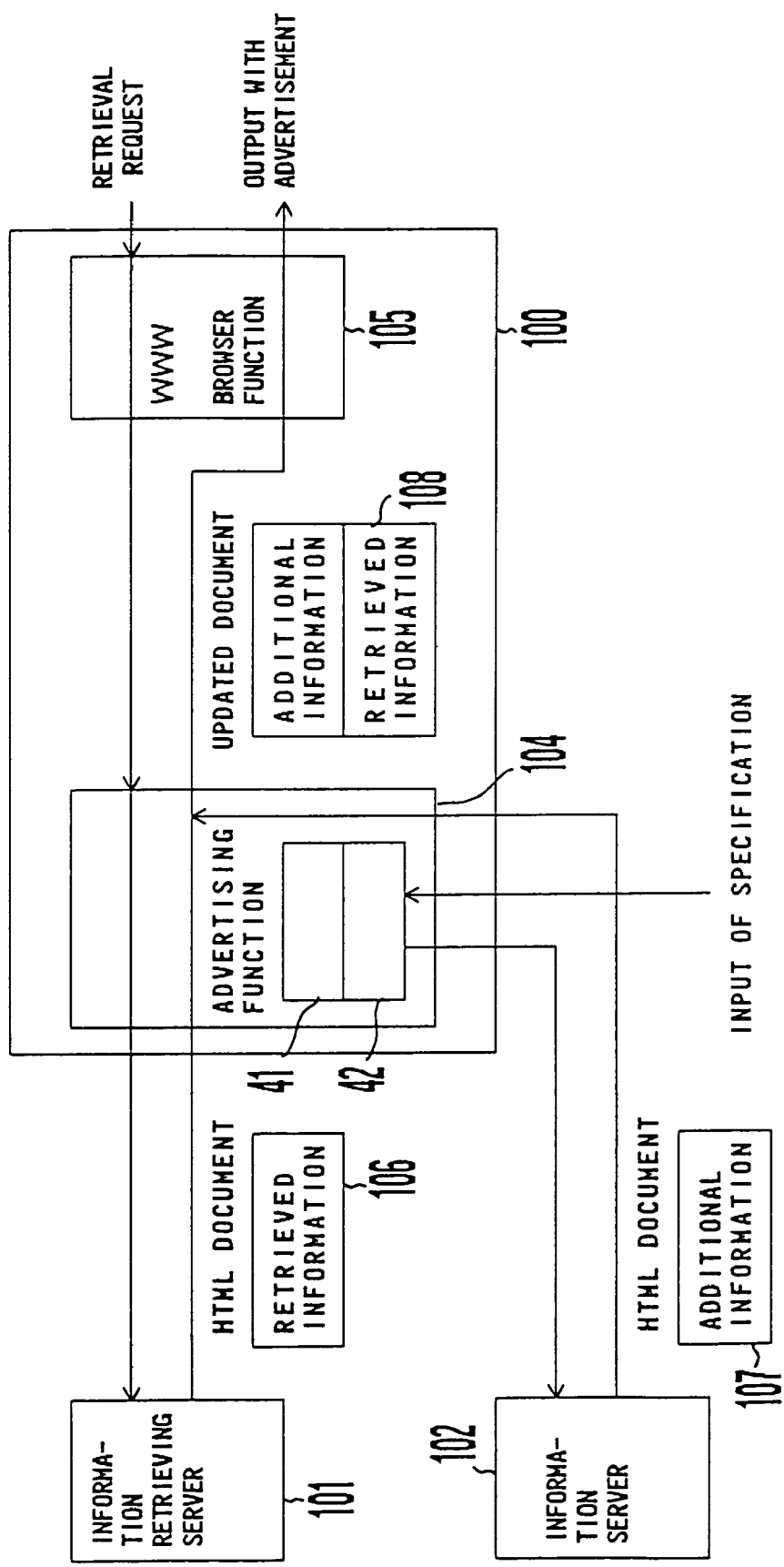
FIG. 4 shows the flow of the retrieved information and advertising information according to the present invention.

Described below is the acquisition of retrieved information through the information retrieving apparatus 100. FIG. 4 shows an embodiment of the present invention and shows the flow of obtaining the retrieved information.

The information retrieving apparatus 100 is a WWW browser provided with the advertising function 104 shown in FIG. 3, and can also be a processing unit provided with the advertising function 104 and a WWW browser function 105. The advertising function 104 mainly comprises the input/output unit 1 (especially the retrieval condition input unit 11 and information display unit 13), the additional information obtaining unit 4, and the information converting unit 2. The WWW browser function 105 mainly comprises the input/output unit 1 (especially the retrieval condition input unit 11 and information display unit 13) and retrieved information obtaining unit 3.

Prior to the acquisition of the retrieved information, the data specifying the information server 102 is stored by the information server specifying unit 41 and the data specifying the additional information is stored by the additional information specifying unit 42 in the advertising function 104 of the information retrieving apparatus 100 by respective instructions as described above.

The WWW browser function 105 of the information retrieving apparatus 100 requests the information retrieving server 101 specified by the retrieval request to retrieve the specified retrieval information as described above.

In response to the request, the information retrieving server 101, which is a WWW server, retrieves its own information and transmits the retrieved information 106 specified by the information retrieving apparatus 100 to the information retrieving apparatus 100 in the format of an HTML document. The information retrieving apparatus 100 fetches the retrieved information 106 in the format of the HTML document through the information retrieving server communicating unit 33 and stores it in the retrieved information storage unit 34.

Then, at a request to obtain the above described retrieved information, the advertising function 104 in the information retrieving apparatus 100 requests the information server 102 specified by the information server specifying unit 41 to retrieve the additional information specified by the additional information specifying unit 42.

In response to the request, the information server 102, which is a WWW server, retrieves its own information and transmits the additional information 107 specified by the advertising function 104 of the information retrieving apparatus 100 to the information retrieving apparatus 100 in the format of an HTML document. The information retrieving apparatus 100 fetches the retrieved information 107 in the format of the HTML document through the information server communicating unit 43 and stores it in the additional information storage unit 44.

The advertising function 104 of the information retrieving apparatus 100 incorporates additional information 107 before the retrieved information 106 as described above to generate updated document 108. At this time, the advertising function 104 converts the HTML document format of the additional information and retrieved information into the document format in the information retrieving apparatus 100. Accordingly, the updated document 108 is represented in the document format in the information retrieving apparatus 100.

The WWW browser function 105 of the information retrieving apparatus 100 receives the updated document 108 from the advertising function 104. The updated document 108 is converted from the HTML document format into the document format in the information retrieving apparatus 100, and additional information is incorporated into the retrieved information. Therefore, the WWW browser function 105 is not aware that the updated document 108 contains additional information. The WWW browser function 105 displays the updated document 108. Thus, the user obtains an output with a corresponding advertisement incorporated.

Figure 5A:
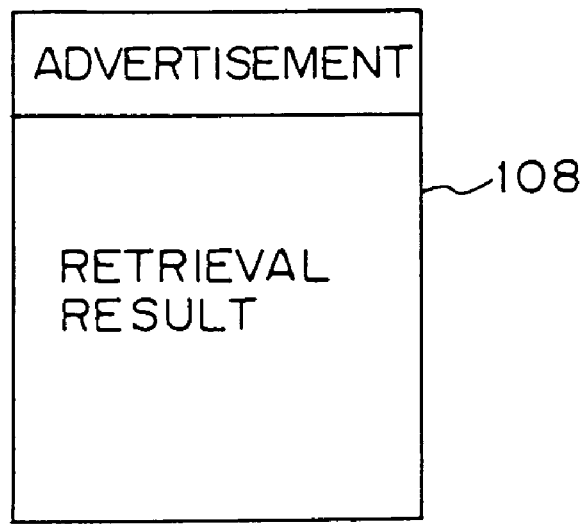
FIG. 5A shows an example of displaying the retrieved information and advertising information through the information retrieving apparatus according to the present invention.
Figure 5B:
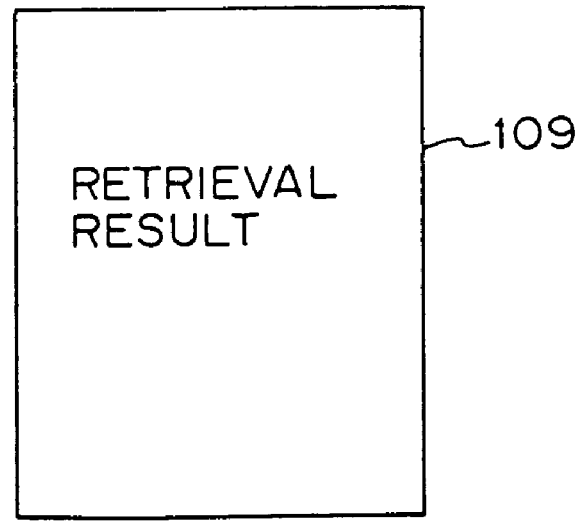
FIG. 5B shows an example of displaying the retrieved information performed by the information retrieving apparatus according to the invention.

The outline of the updated document 108 displayed on the information display unit 13 is described by referring to FIGS. 5A and 5B.

As shown in FIG. 5A, the advertising information, that is, additional information, is incorporated before the retrieved information obtained as a retrieval result. On the display screen of the information display unit 13, the advertising information, that is, additional information, is displayed first (at the top on the screen).

Since there is a large volume of the retrieved information 106, the updated document 108 may not be displayed on one screen. Therefore, the display screen of the information display unit 13 shown in FIG. 5A is scrolled up and down. This is performed by, for example, the input/output unit 1.

If the advertising information, that is, additional information, is not incorporated, then only the retrieved information is displayed on the display screen as shown in FIG. 5B. The screen is designed to avoid a double-display of the additional information when the information retrieving server 101 and retrieved information are specified using the additional information as described above.

The home page of the information retrieving server 101 and the page relating to the additional information from the information server 102 can be displayed as shown in FIG. 5A or 5B.

Figure 6:
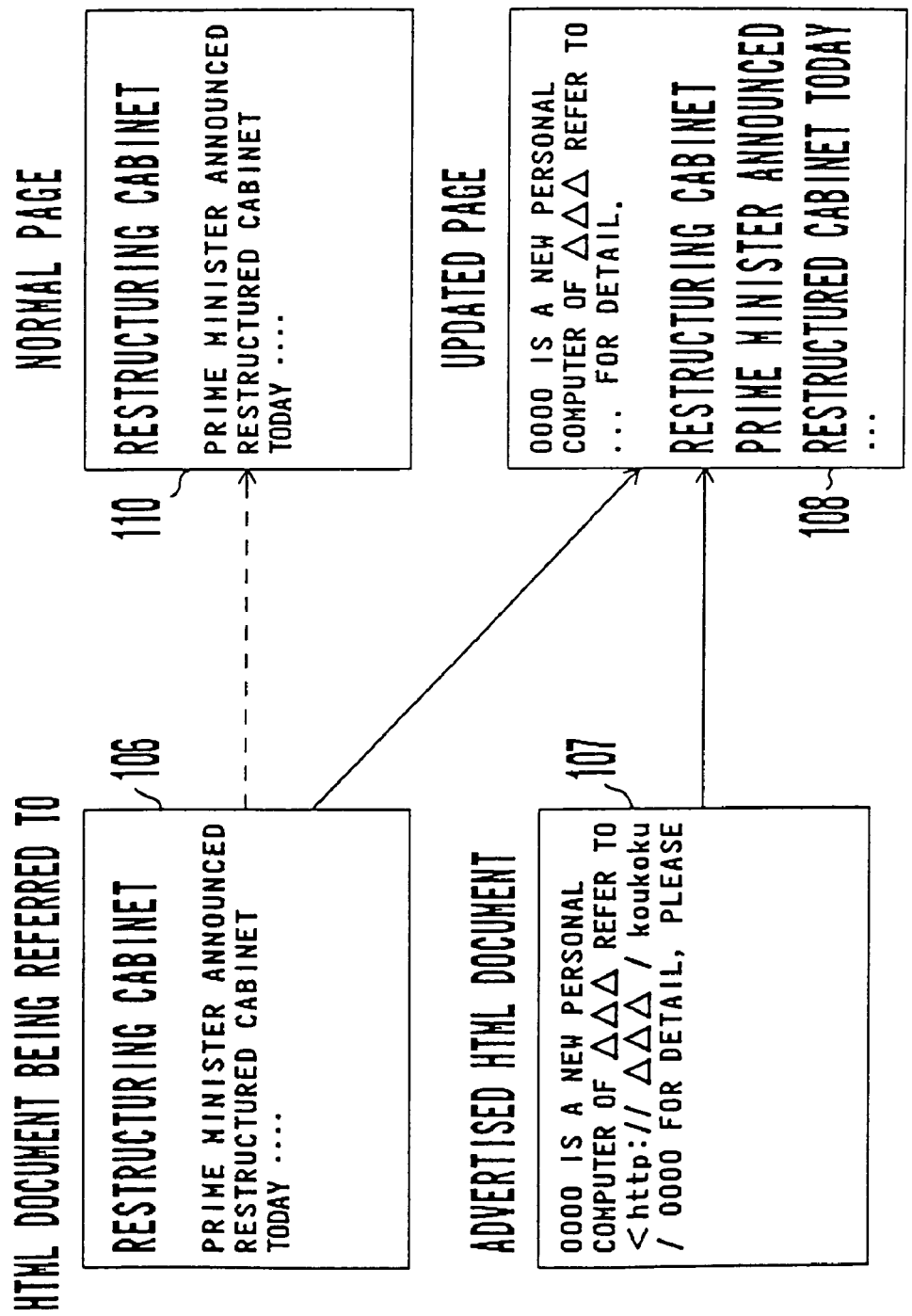
FIG. 6 shows an example of a display screen using the information retrieving apparatus according to the present invention.

Next, a practical example of the updated document 108 displayed on the information display unit 13 is described by referring to FIG. 6.

The retrieved information 106 obtained from the information retrieving server 101 is an HTML document having the contents as shown in FIG. 6, for example. The information can be, for example, an article in a newspaper about a specified subject on a specified date. The additional information 107 obtained from the information server 102 can be, for example, an HTML document having the contents as shown in FIG. 6. It refers to an advertisement for a new personal computer from a specified manufacturer.

When the retrieved information 106, that is, an HTML document, is displayed on the information display unit 13, a normal page 110 is displayed. It is a conventional display screen.

If the additional information 107, that is, an HTML document, is incorporated and displayed before the retrieved information 106, that is, another HTML document, then the updated document 108 is displayed. This corresponds to FIG. 5A. The additional information 107, that is, advertising information, is displayed at the top of the screen while the retrieved information 106 is displayed at the bottom of the screen. Therefore, the user can view an advertisement for an interesting personal computer together with the article in a newspaper for which the user issued a retrieval request.

In the additional information 107, an anchor "<http://△△△koukoku/○○○○>" is inserted between "refer" and "please" in the advertising document as shown in FIG. 6. In this example, "△△△" indicates a server name relating to the server (from a plurality of servers) from the △△△ (name of a manufacturer). Also, "koukoku/○○○○" is a retrieval indicator indicating the contents of the (advertisement) information. △△△ and ○○○○ are symbols for alphabetical letters, alphanumerics, etc.

The anchor is information for use by the user who views the additional information 107, that is, an advertisement, to directly access the detailed information about the additional information on the screen. When the anchor is specified on the screen of the information display unit 13, the anchor "<http://△△△/koukoku/○○○○>" is copied from the screen as a retrieval condition, and transmitted to the retrieval condition input unit 11. Then, "△△△" is stored by the information retrieving server specifying unit 31 and "koukoku/○○○○" is stored by the retrieval information specifying unit 32 from the retrieval condition input unit 11. Therefore, the information retrieving apparatus 100 accesses the △△△ (advertisement) server and obtains (advertising) information "koukoku/○○○○."

As shown in FIG. 6, the anchor has been inserted by the information server 102 or the advertiser at the position immediately after the word "refer to" in the text of the additional information 107, that is, an advertising information, when the additional information 107 is provided in the HTML document format. Therefore, it is inserted and stored at the above described position in the additional information storage unit 44 and the memory for display in the information display unit 13.

However, the anchor is not displayed on the information display unit 13 as shown on the page of the updated document 108. That is, the user cannot see the anchor. Instead of the anchor, an underline (anchor tag) is added below the words "refer to" related to the anchor. In addition to the underline, the color of "refer to" can be altered.

If the user select using the mouse on the words "refer to" underlined in association with the anchor, the anchor is specified on the screen of the information display unit 13. The information display unit 13 retrieves the anchor at the position immediately after the words "refer to" from its own memory for display, and inputs it to the retrieval condition input unit 11. Thus, a retrieval request for information specified by the anchor is issued to the server specified by the anchor.

Therefore, when the user select using the mouse on the anchor relating to the additional information 107 as described above, the contents of the anchor are copied to the retrieval condition input unit 11 and input. Thus, the detailed information about the additional information is obtained. In this case, the additional information is copied to obtain the retrieved information 106 (the additional information 107 in contents). Therefore, the display screen is as shown in FIG. 5B.

The detailed information about the additional information contains the information (hereinafter referred to as contract information) according to which the user contracts with the advertiser to purchase the advertised product described in the detailed information. The screen of the contract information can be designed to be accessed on the screen of, for example, the detailed information. That is, as described above, it is obtained from the information server 102 when the user select using the mouse on the words relating to the anchor inserted on the screen of the detailed information.

The use of such additional information is recorded in the additional information use history storage unit 51. For example, the number of times the information is used is recorded "+2" because the detailed information is obtained from the advertisement, and the contract information is obtained from the detailed information. When a purchase contract is signed for the advertised product, it is also recorded.

An anchor can also be inserted in the retrieved information 106 as well as the additional information 107 so that another retrieved information 106 can be referred to. The other retrieved information 106 is obtained by selecting with the mouse on the anchor. However, since the retrieved information 106 is not obtained by copying the additional information, the advertising information, that is, additional information, is also obtained. Accordingly, the display screen is as shown in FIG. 5A.

Figure 7:
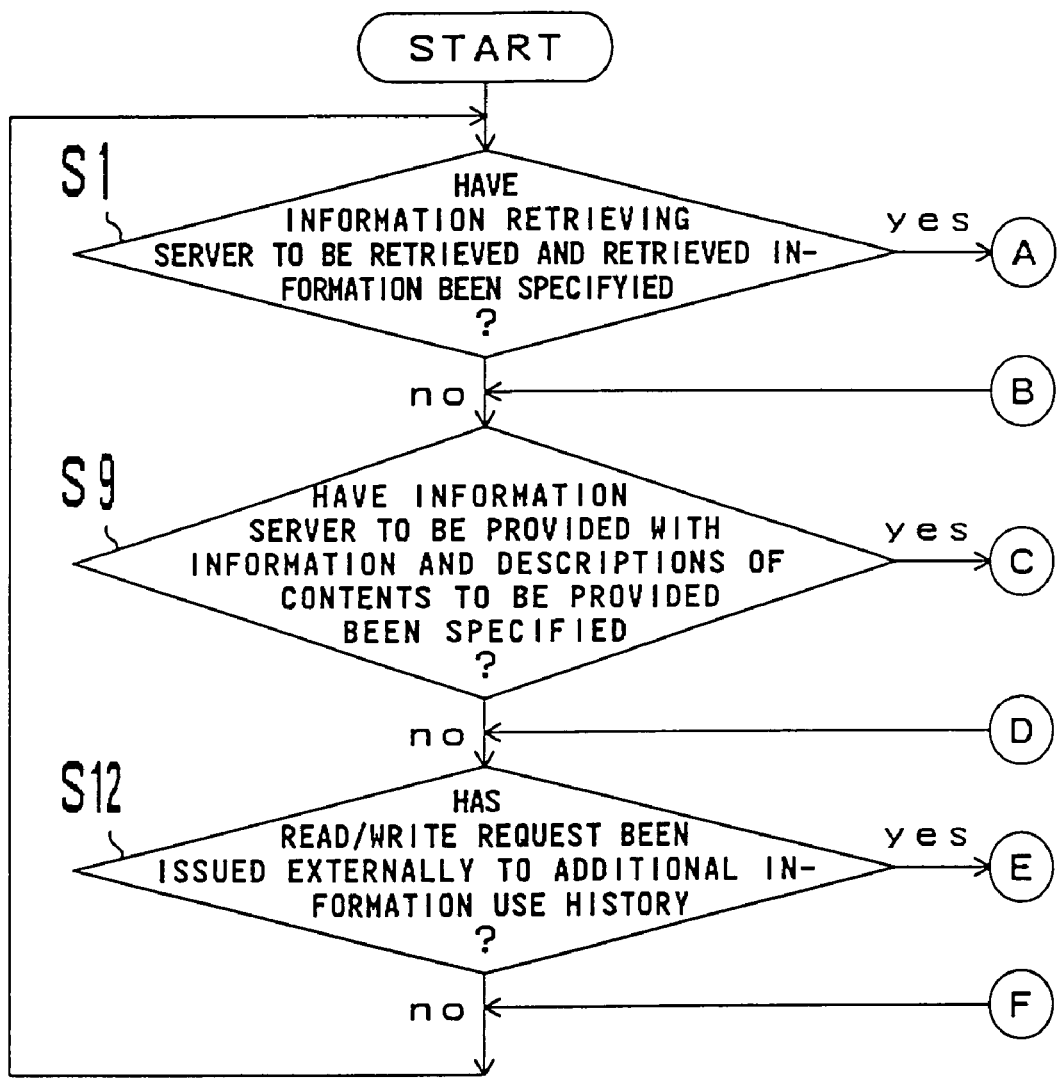
FIGS. 7, 8, 9A, and 9B are flowcharts showing the information retrieving process according to the present invention.
Figure 8:
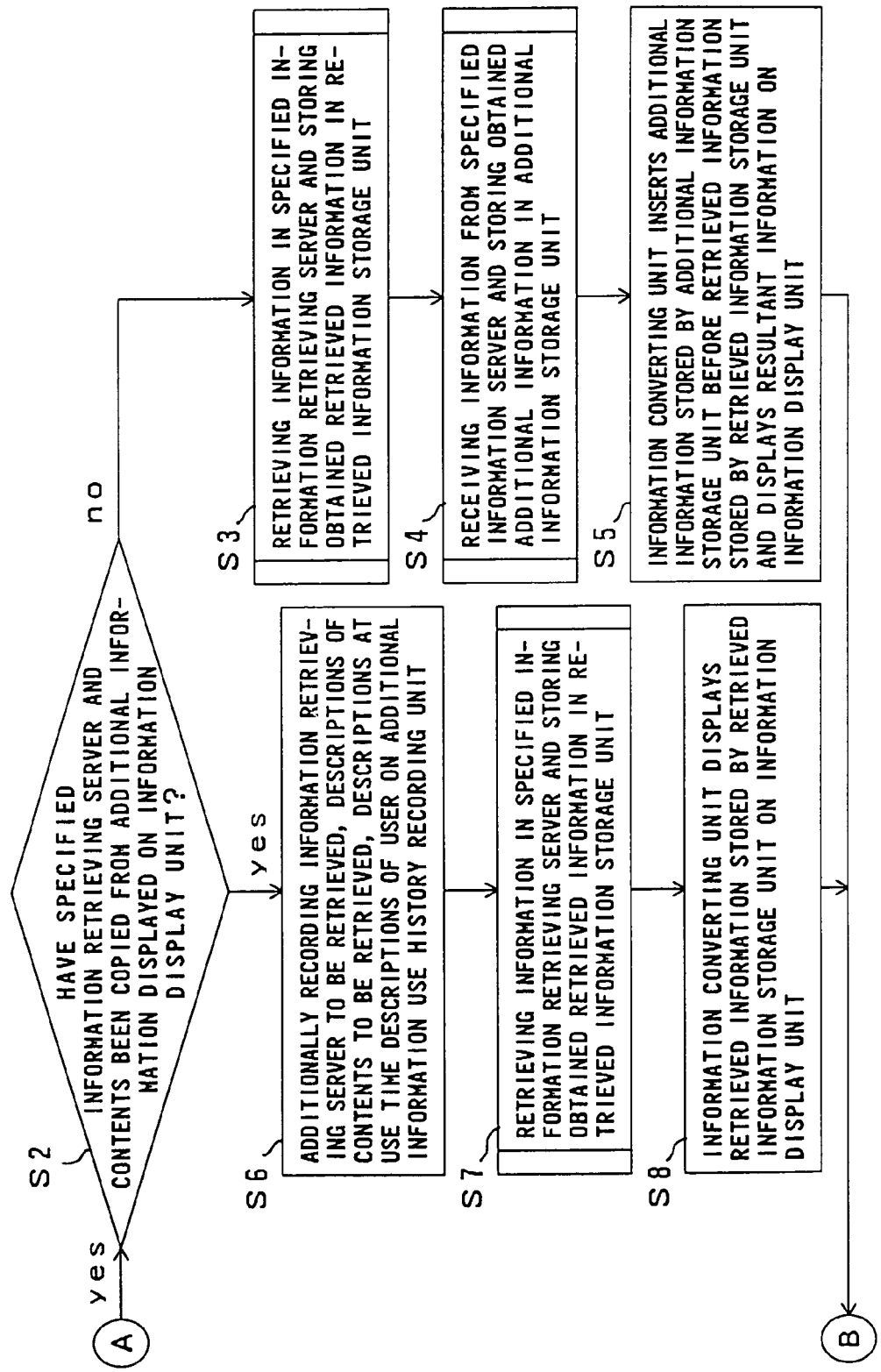
Figure 9A:
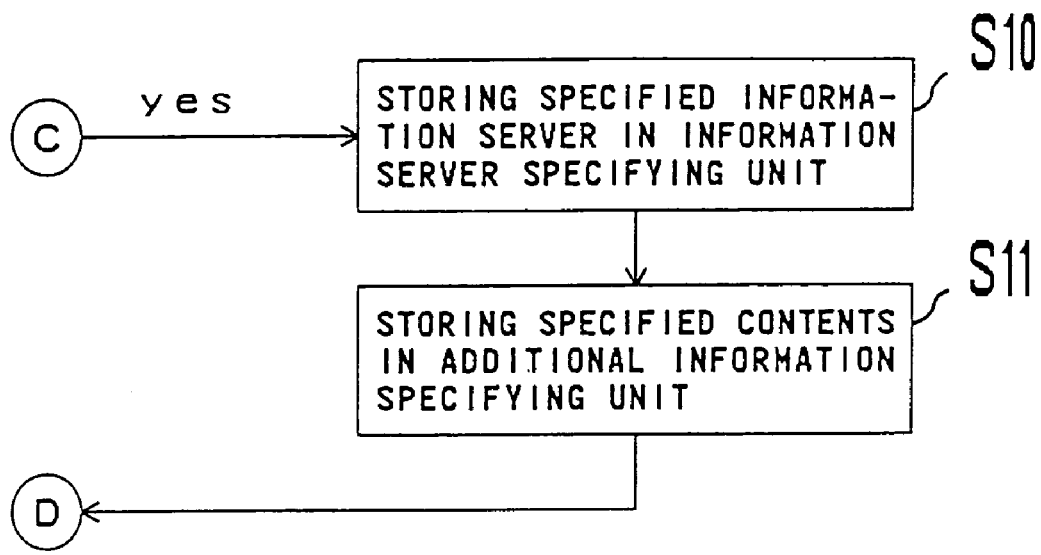
Figure 9B:
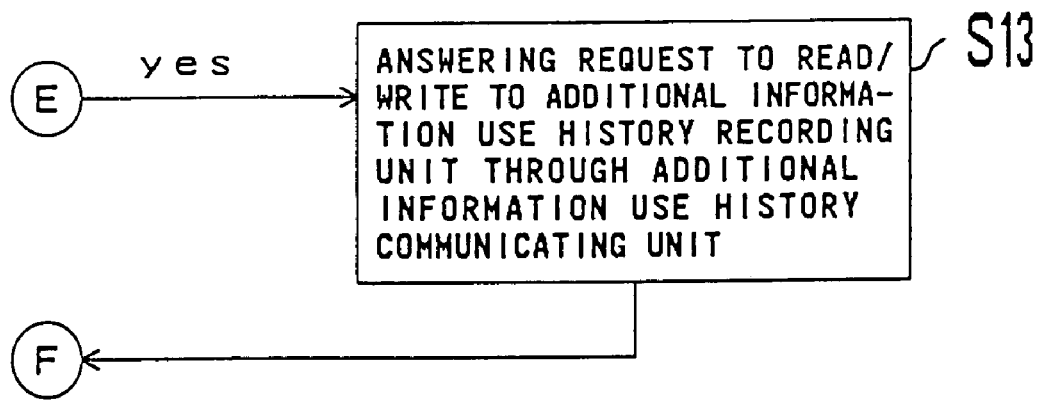
Figure 10:
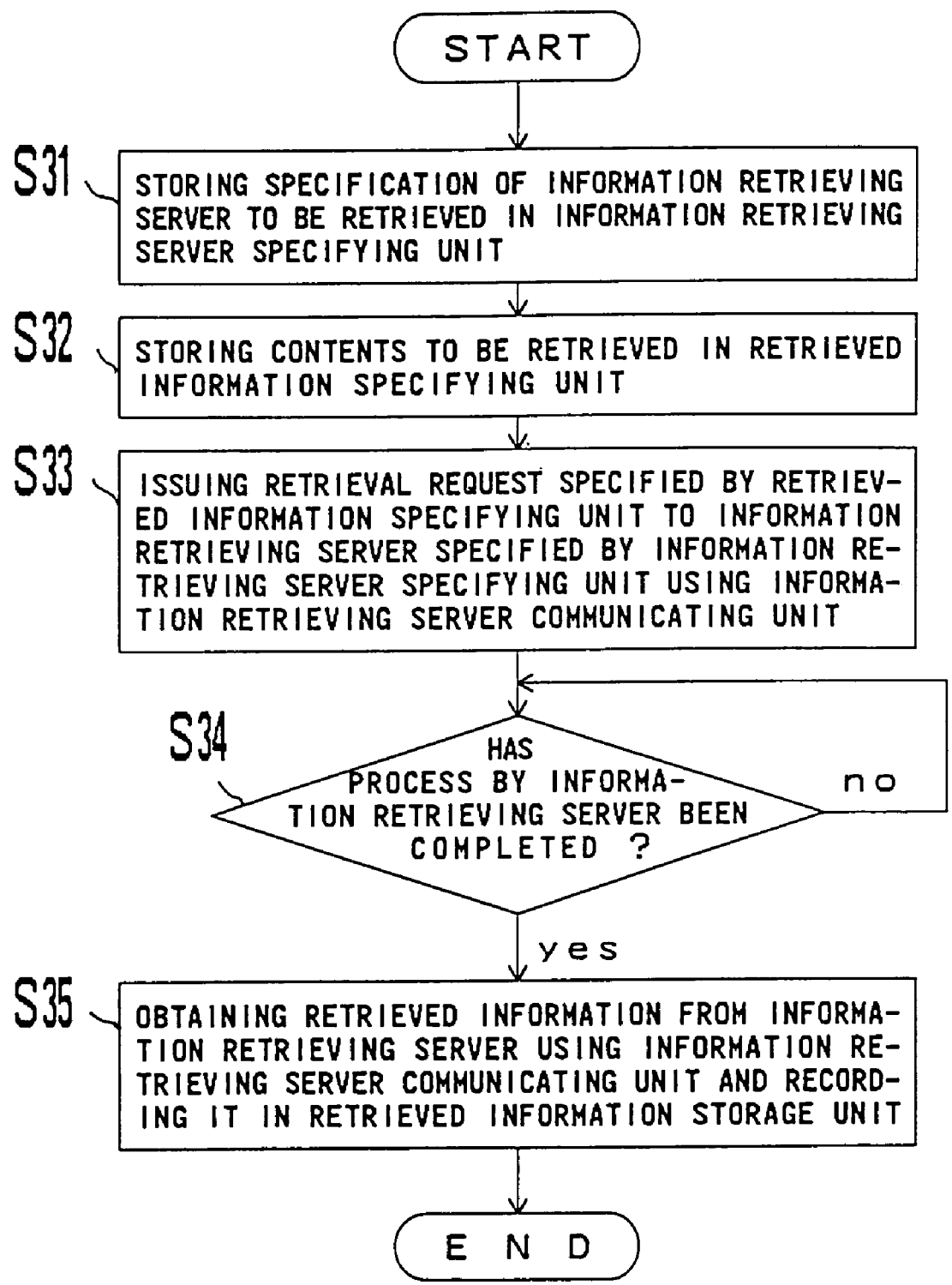
FIG. 10 is a flowchart showing the retrieved information obtaining process according to the present invention.
Figure 11:
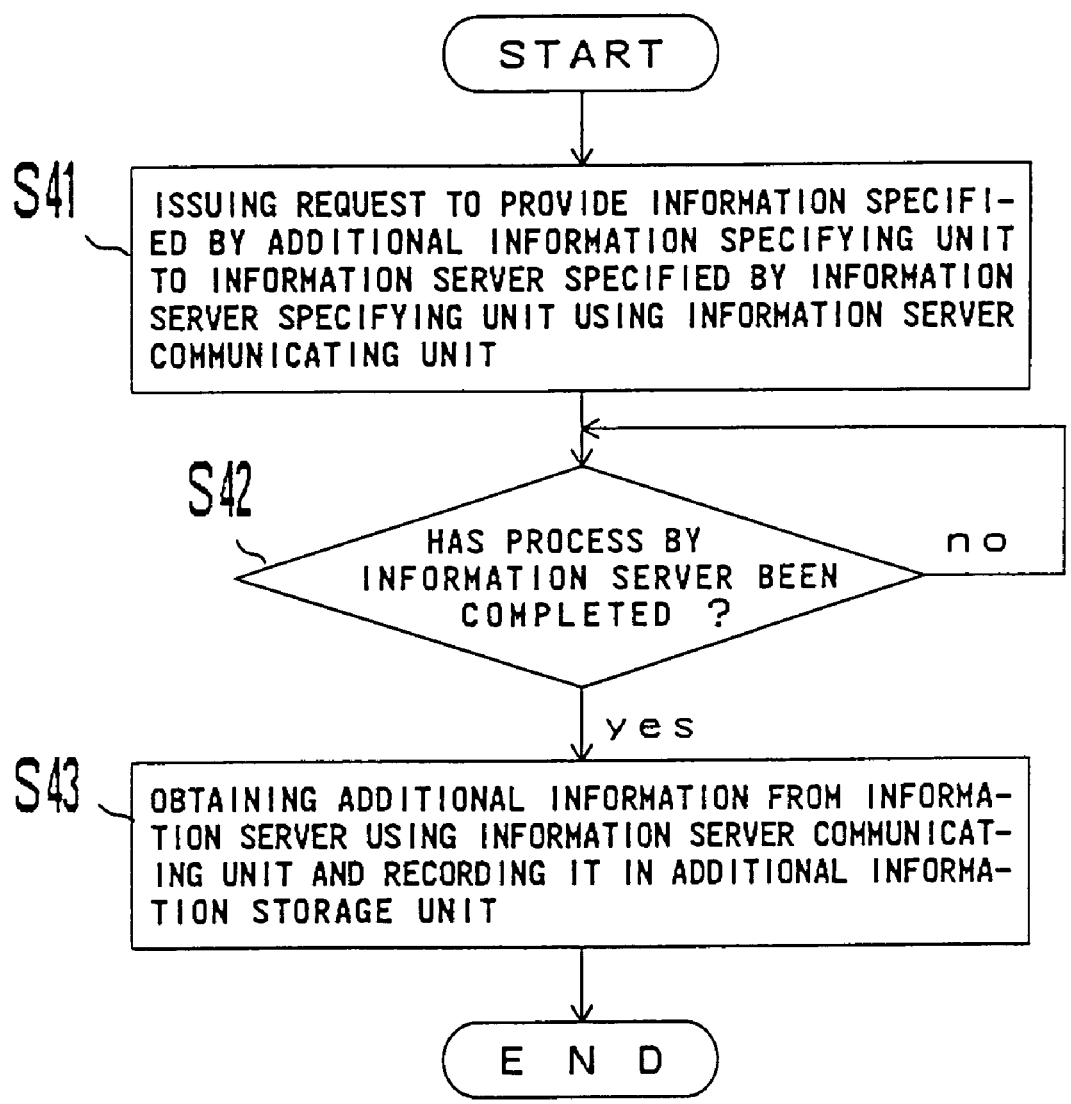
FIG. 11 is a flowchart showing the additional information obtaining process according to the present invention.

Then, the information retrieving process performed by the information retrieving apparatus shown in FIG. 2 is described by referring to FIGS. 7 through 11. FIGS. 7 through 9 are flowcharts showing an entire information retrieving process and the information retrieving process performed by the information retrieving apparatus 100 shown in FIG. 2. FIG. 10 shows in detail the retrieved information obtaining process shown in FIG. 8. FIG. 11 shows in detail the additional information obtaining process shown in FIG. 8.

As shown in FIG. 7, the input/output unit 1 checks through the retrieval condition input unit 11 whether or not the information retrieving server 101 for receiving a retrieval request and the description of the retrieved contents (retrieved information) have been specified (S1).

When the above described two pieces of data are specified in step S1, the information converting unit 2 checks whether or not the information retrieving server 101 for retrieving information and the description of the retrieved contents input through the retrieval condition input unit 11 have been copied (or specified) from the additional information displayed on the information display unit 13 (S2). That is, it is checked whether or not the name of the information retrieving server and the name of information to be retrieved are specified according to the additional information.

When the above described two pieces of data are not copied in S2, the retrieved information obtaining unit 3 instructs the information retrieving server 101, which is specified to receive a retrieval request, to retrieve information so that the described and retrieved information can be obtained and then stored by the retrieved information storage unit 34 (S3). This process is described later by referring to FIG. 10.

The additional information obtaining unit 4 receives additional information from the specified information server 102, and stores the obtained additional information in the additional information storage unit 44 (S4). This process is described later by referring to FIG. 11.

The information converting unit 2 inserts the additional information stored by the additional information storage unit 44 before the retrieved information stored by the retrieved information storage unit 34. The information is displayed on the information display unit 13 (S5). Then, the process in step S9 is performed.

If the two pieces of data are copied in S2, the information retrieving server 101 to be accessed for retrieving data, contents to be retrieved, time of use, and user names are additionally recorded in the additional information use history storage unit 51 (S6).

As in step S3, the retrieved information is obtained and stored by the retrieved information storage unit 34 (S7).

The information converting unit 2 transmits the retrieved information stored by the retrieved information storage unit 34 to the information display unit 13, and the information is displayed on the information display unit 13 (S8). Then, the process in step S9 is performed.

When the above described two pieces of data are not specified in step S1, the input/output unit 1 checks through the provided condition input unit 12 whether or not the information server 102 for receiving information and the description of the contents of additional information have been specified (S9).

If they are specified, the additional information obtaining unit 4 stores the specified information server name in the information server specifying unit 41 (S10), and stores the name of the additional information in the additional information specifying unit 42 (S11). Then, the process in S12 is performed.

When the above described two pieces of data are not specified in step S9, the additional information use history management unit 5 checks whether or not a request to read or write the contents of the additional information use history storage unit 51 has been issued (S12).

When a read/write request has been issued, then the additional information use history management unit 5 reads or writes the contents of the additional information use history storage unit 51 through the additional information use history communications unit 52 (S13).

After performing the process in S13 and when no read/write request has been issued in S12, the processes in and after S1 is repeated.

FIG. 10 is a flowchart showing the retrieved information obtaining process, and shows the process of obtaining the retrieved information in S3 and S7 in FIG. 8.

The retrieved information obtaining unit 3 stores the information retrieving server name input from the retrieval condition input unit 11 in the information retrieving server specifying unit 31 (S31).

The retrieved information obtaining unit 3 stores in the retrieval information specifying unit 32 the contents input from the retrieval condition input unit 11 and to be retrieved (S32).

The retrieved information obtaining unit 3 requests, through the information retrieving server communicating unit 33, the information retrieving server 101 specified by the information retrieving server specifying unit 31 to retrieve the information specified by the retrieval information specifying unit 32 (S33).

The retrieved information obtaining unit 3 checks whether or not the process of the information retrieving server 101 has been completed (S34). If the process has not been completed, the process in S34 is repeated.

If the process has been completed, the retrieved information obtaining unit 3 obtains the retrieved information from the information retrieving server 101 through the information retrieving server communicating unit 33 and records the information in the retrieved information storage unit 34 (S35).

FIG. 11 is a flowchart showing the additional information obtaining process, and shows the process of obtaining the additional information in S4 shown in FIG. 8.

In S10 and S11 shown in FIG. 9A prior to this process, the name of the information server specified by the provided condition input unit 12 is stored by the information server specifying unit 41, and the description of the contents of the additional information specified by the provided condition input unit 12 is stored by the additional information specifying unit 42.

The additional information obtaining unit 4 requests, through the information server communicating unit 43, the information server 102 specified by the information server specifying unit 41 to retrieve the additional information specified by the additional information specifying unit 42 (S41).

The additional information obtaining unit 4 checks whether or not the process of the information server 102 has been completed (S42). If the process has not been completed, the process in S42 is repeated.

If the process has been completed, the additional information obtaining unit 4 obtains the additional information from the information server 102 through the information server communicating unit 43 and records the information in the additional information storage unit 44 (S43).

The retrieved information obtaining process shown in FIG. 10 and the additional information obtaining process shown in FIG. 11 can be performed in series or in parallel as described above. That is, the process in step S41 can be performed between the processes in S33 and S34.

As described above, the retrieved information (updated document 108) is obtained in the information retrieving apparatus 100.

First, in the conventional procedure, the user accesses the advertising agent server 102A from the information retrieving apparatus 100 to be informed what information server 102 provides what advertising information (additional information 107), and selects the information server 102 and additional information in which the user takes an interest. The information server 102 and additional information are specified in the information retrieving apparatus 100 (respectively stored by the information server specifying unit 41 and additional information specifying unit 42) and entered in the advertising agent server 102A. Thus, the additional information 107 is displayed and the information fees for the retrieved information, etc. can be reduced.

Next, in the conventional procedure, the user accesses the information retrieving server 101 from the information retrieving apparatus 100 to obtain the retrieved information 106. At this time, the information retrieving apparatus 100 automatically accesses the specified information server 102 and obtains the specified additional information 107. Then, the information retrieving apparatus 100 incorporates the additional information 107 into the retrieved information 106 and displays the updated document 108.

When the user who has viewed the updated document 108 accesses the detailed information from a portion of the additional information contained in the page, the information retrieving apparatus 100 accesses the information retrieving server 101 (actually the information server 102) specified by copying the additional information, and obtains new retrieved information 106 (actually the detailed information about the additional information 107). At this time, the information retrieving apparatus 100 omits obtaining the additional information 107 to avoid double display of the additional information 107.

On the other hand, when the user who has viewed the updated document 108 accesses further retrieved information from a portion of the retrieved information contained in the page, the information retrieving apparatus 100 accesses a new information retrieving server 101 specified by copying the retrieved information, and obtains new retrieved information 106. At this time, the information retrieving apparatus 100 automatically accesses the information server 102 and obtains the additional information 107. Then, the information retrieving apparatus 100 incorporates the additional information 107 into the retrieved information 106 and displays the updated document 108.

The information server 102 can be designed not to transmit the additional information 107 to the information retrieving apparatus 100. That is, since access is repeated for a plurality of times in a short time, the user has the problem of repeatedly viewing the same additional information in a short time. To avoid this problem, the information server 102 stops transmitting the additional information 107.

Described below is the second embodiment of the present invention. It is an improved example of the first embodiment to enhance the effect of providing additional information by appropriately selecting the additional information in which the user possibly takes an interest. In this embodiment, the information server 102, that is, an advertisement server, analyzes the retrieval information to be obtained by the user of the information retrieving apparatus 100, and appropriately selects and provides the advertising information. Thus, the information server 102 provides the user with interesting information and enhances the effect of the advertisement.

In this embodiment, the attribute information of the user of the information retrieving apparatus 100 is used as the data specifying the additional information to be stored by the additional information specifying unit 42 as described later, Therefore, in the following explanation, the data specifying the additional information may be referred to as attribute information.

Figure 13:
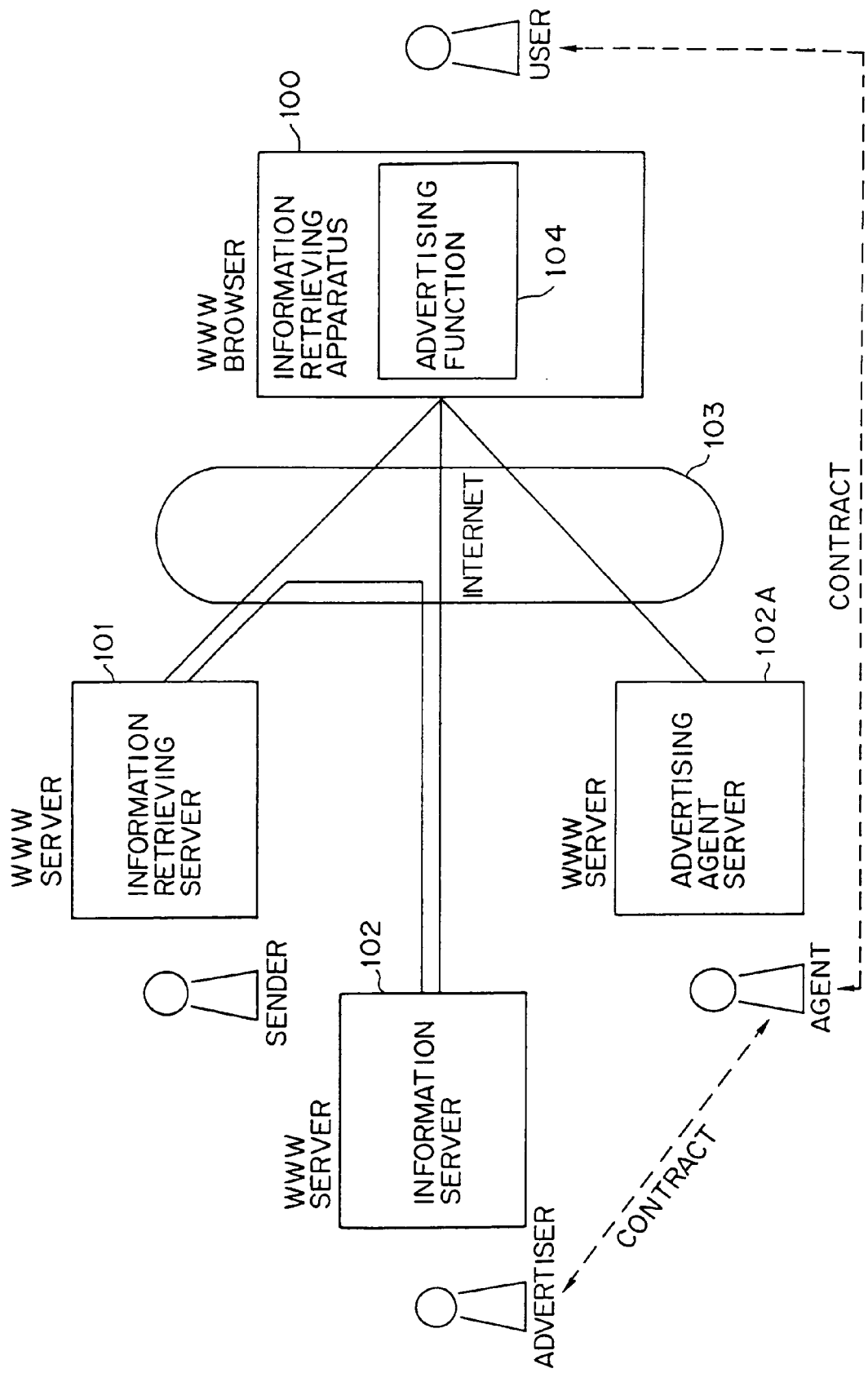
FIG. 13 shows the second information retrieving system using the information retrieving apparatus according to the present invention.
Figure 14:
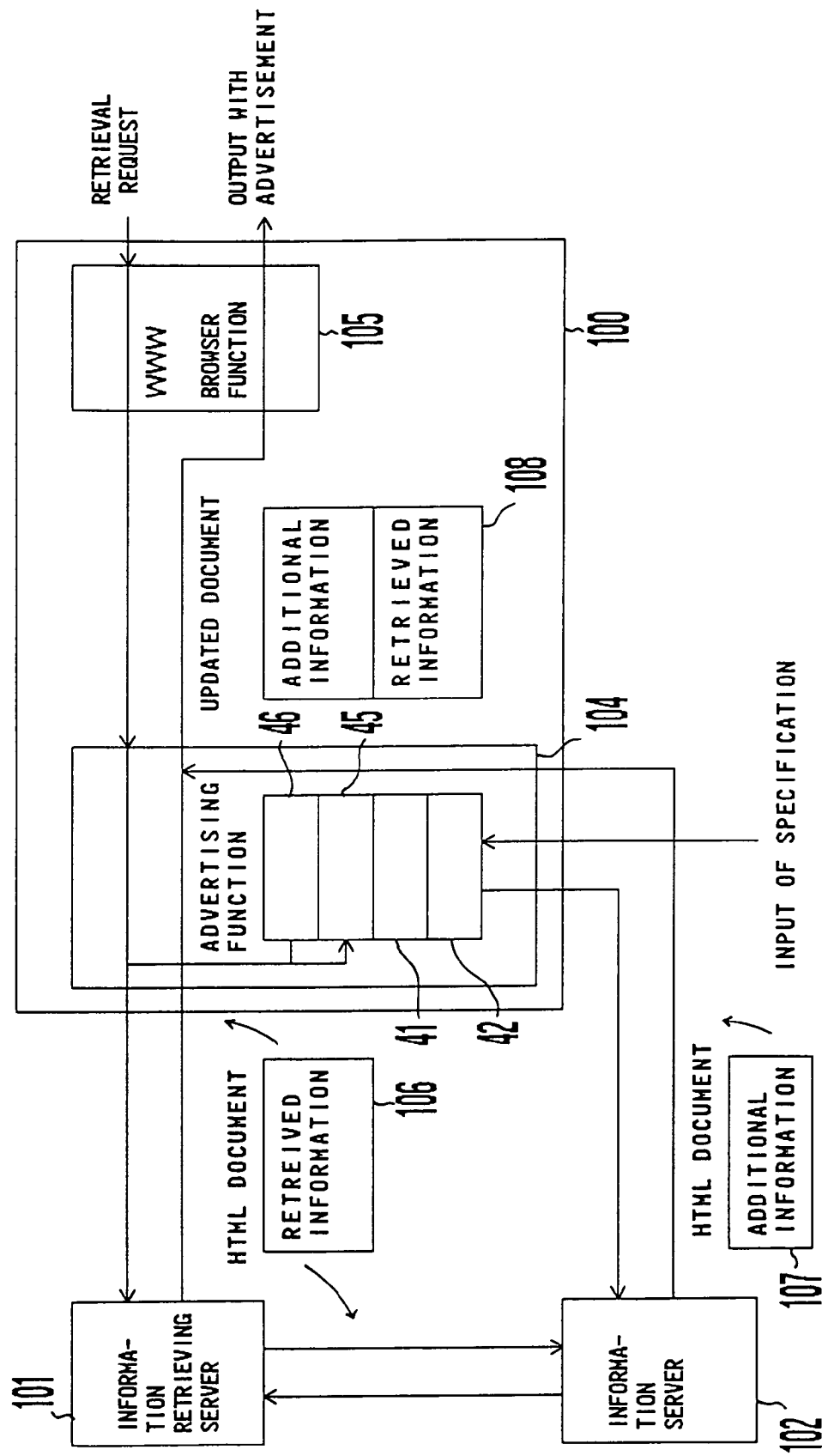
FIG. 14 shows the flow of the retrieved information and advertising information according to the present invention.
Figure 15:
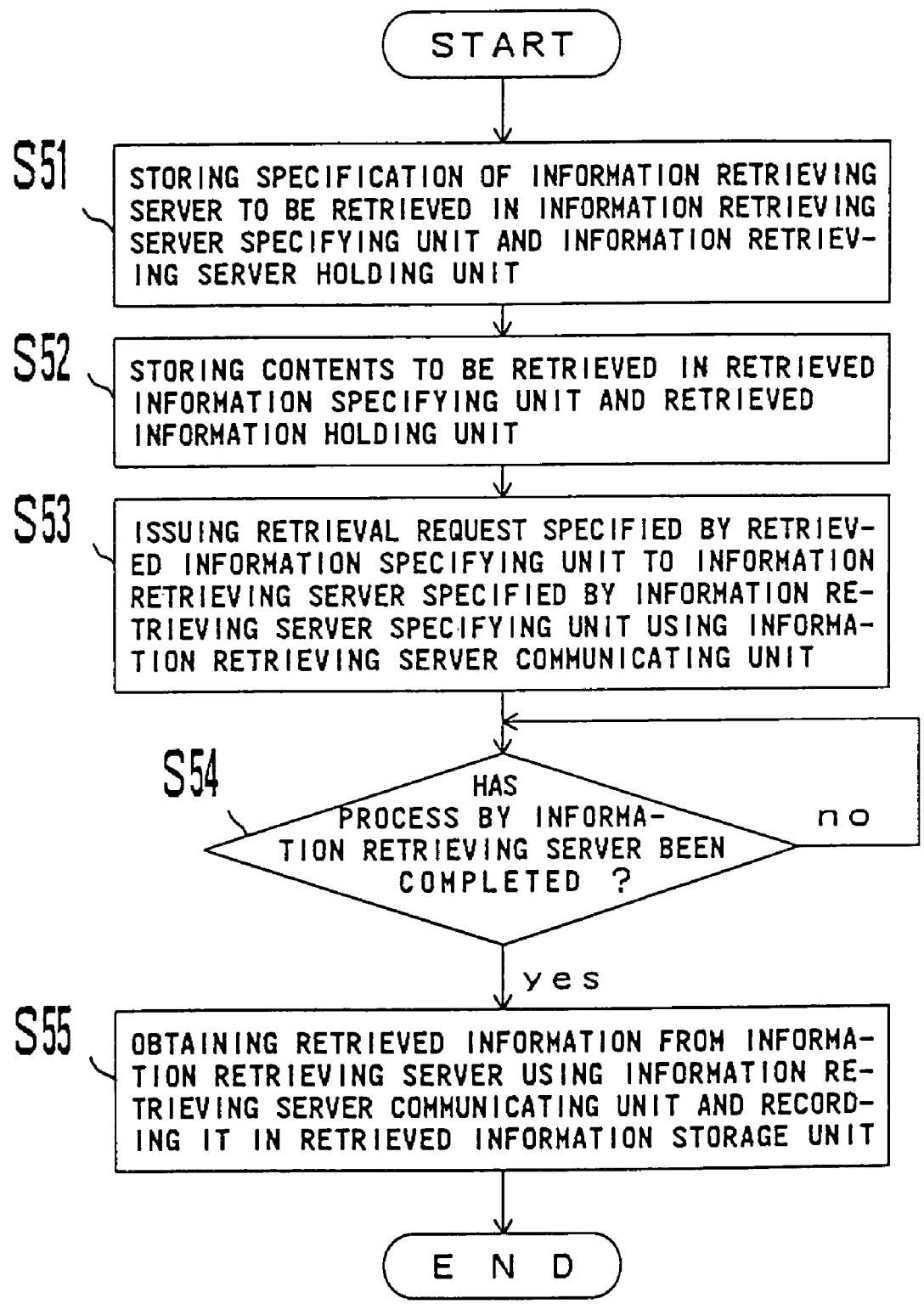
FIG. 15 is a flowchart showing the second retrieved information obtaining process according to the present invention.
Figure 16:
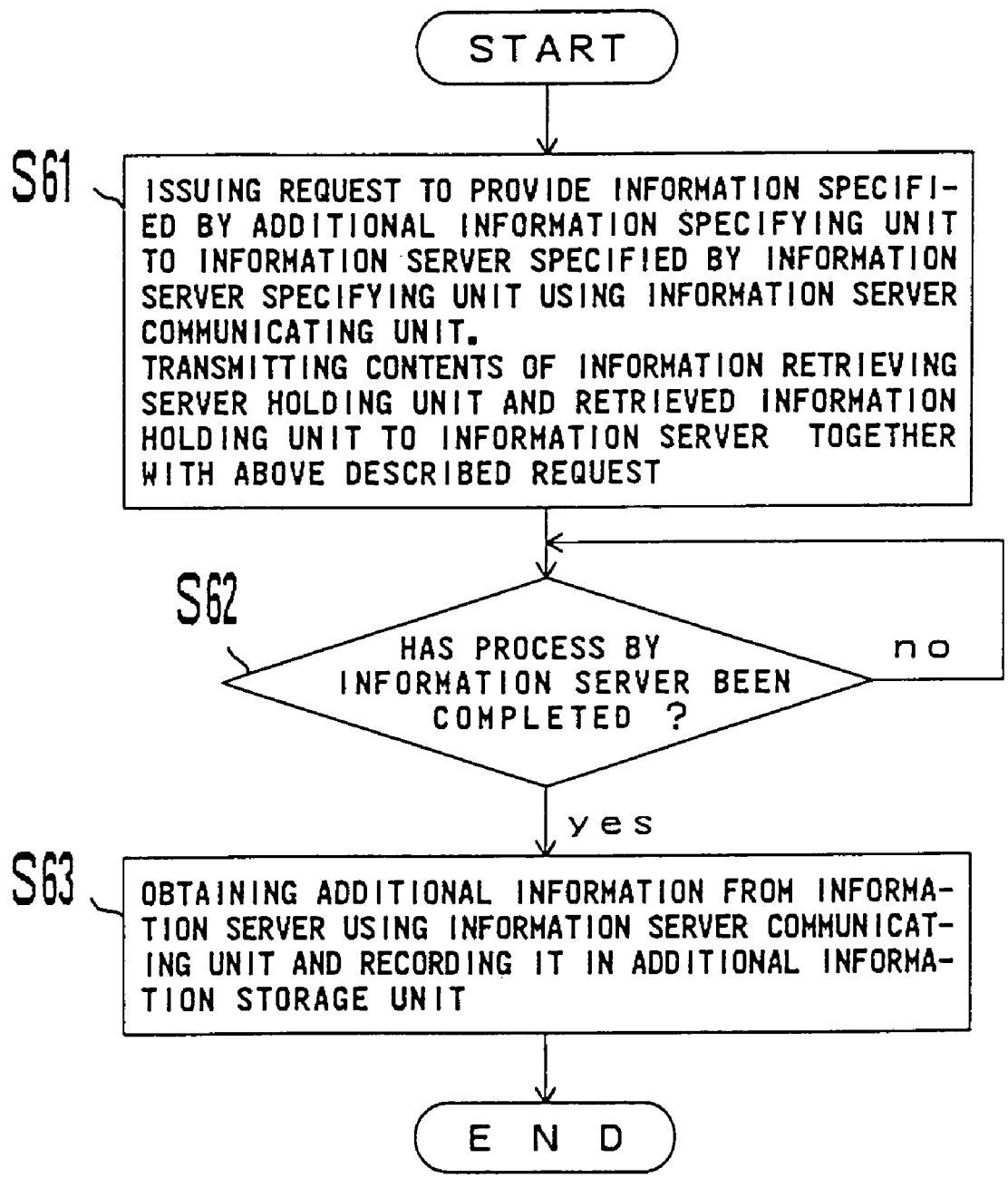
FIG. 16 is a flowchart showing the second additional information obtaining process according to the present invention.
Figure 17:
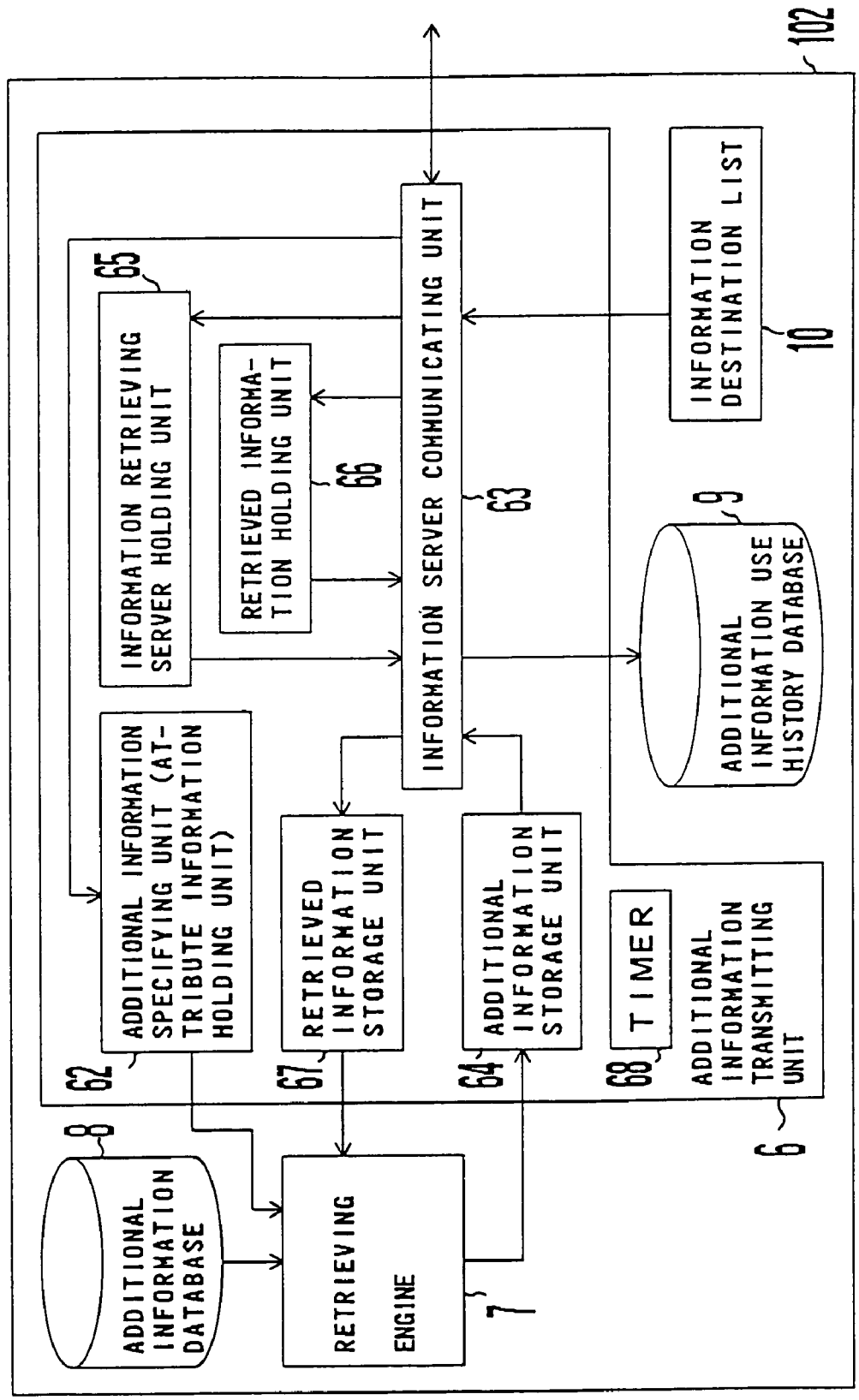
FIG. 17 shows the configuration of the information server according to the present invention.
Figure 18:
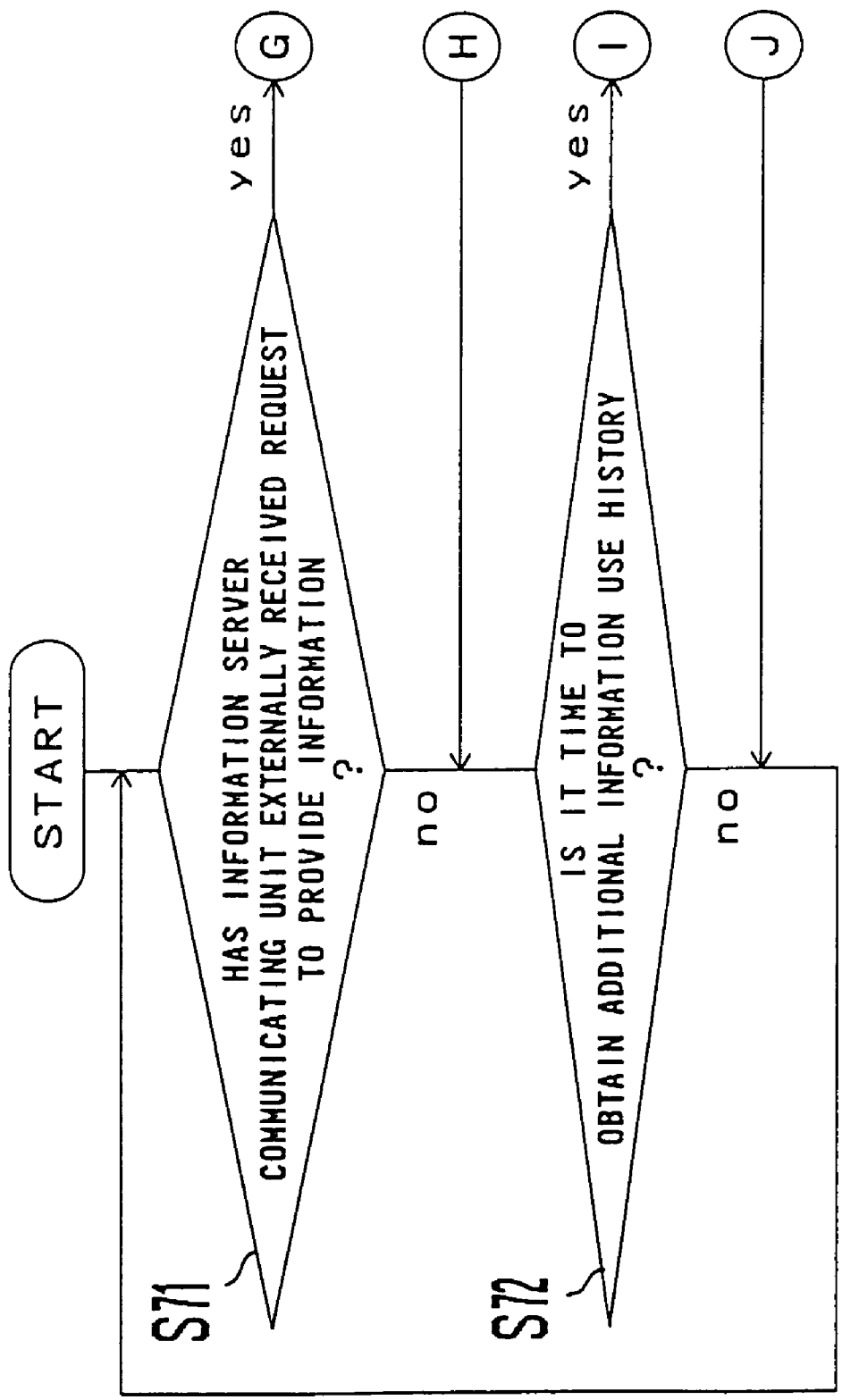
FIGS. 18, 19, and 20 are flowcharts showing the additional information transmitting process according to the present invention.
Figure 19:
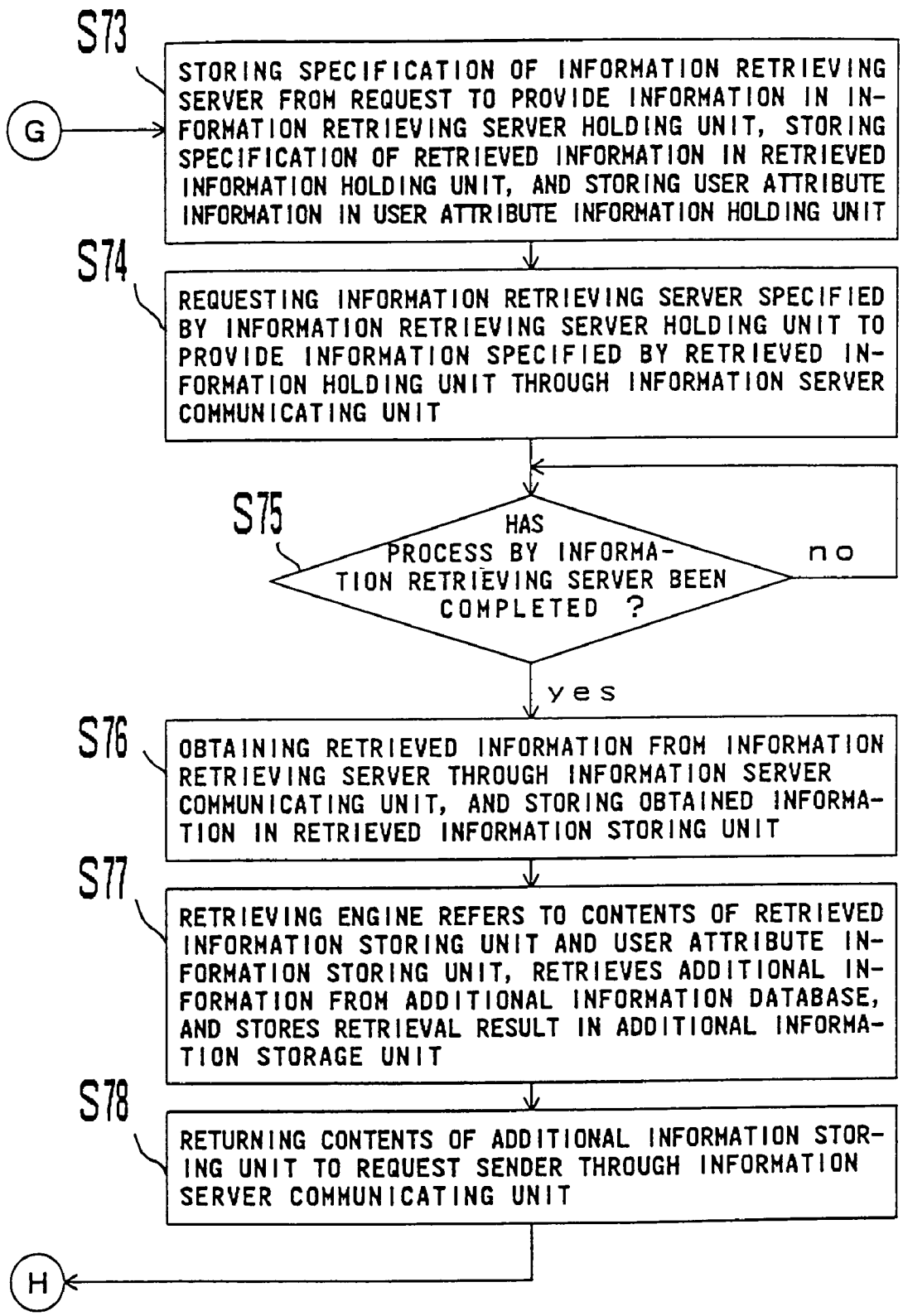
Figure 20:
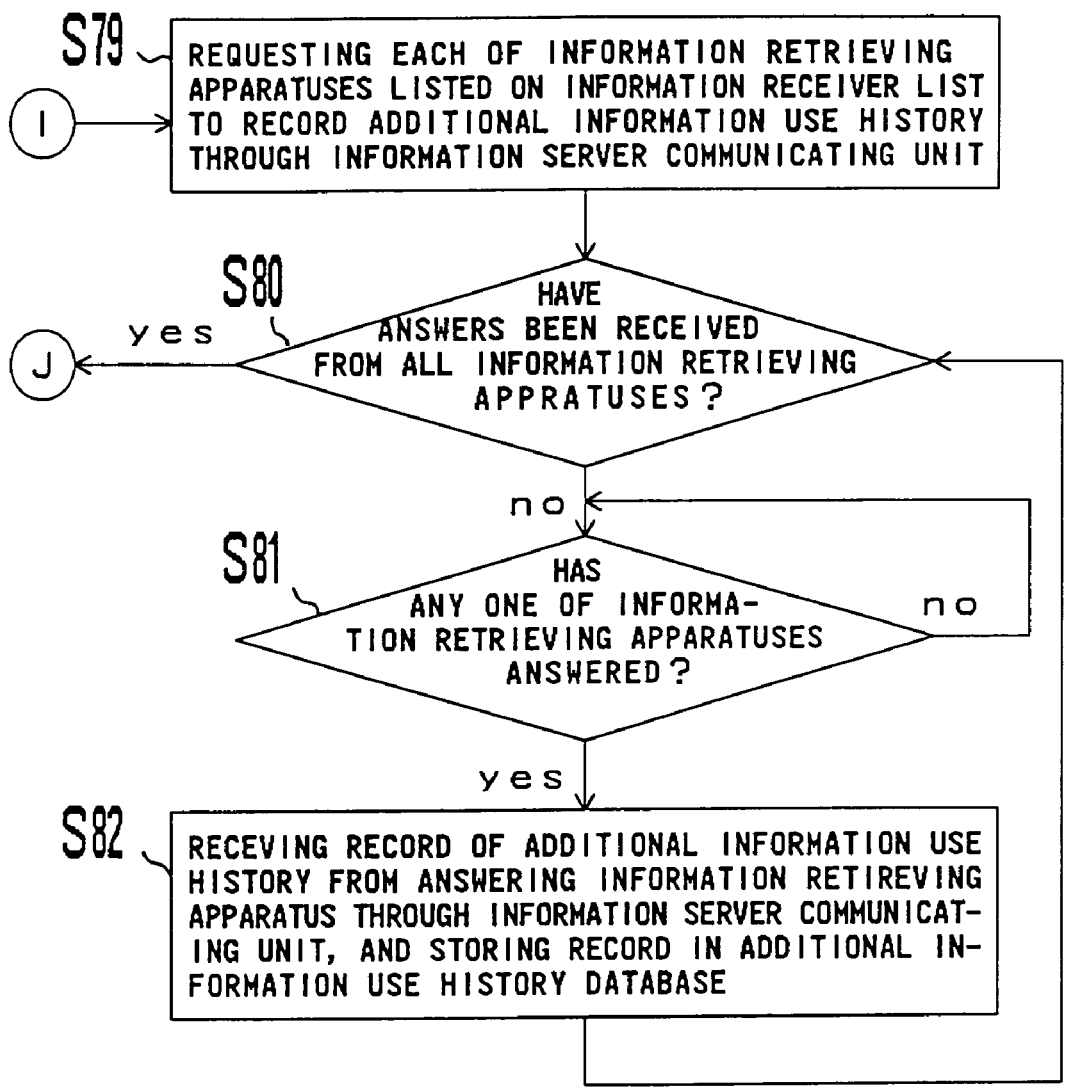

In this embodiment, the information retrieving apparatus 100 shown in FIG. 12 is used as a WWW browser, and the information server 102 shown in FIG. 17 is used as an information server, that is, a WWW server. When the information retrieving apparatus 100 shown in FIG. 12 automatically accesses the information server 102 shown in FIG. 17, the information server 102 automatically obtains the retrieved information which the user of the information retrieving apparatus 100 is obtaining as shown in FIGS. 13 and 14. FIGS. 15 and 16 are flowcharts showing the process performed by the information retrieving apparatus 100 shown in FIG. 12. FIGS. 18 through 20 are flowcharts showing the process performed by the information server 102 shown in FIG. 17.

FIG. 12 shows the second example of the configuration of the information retrieving apparatus 100. The information retrieving apparatus 100 shown in FIG. 2 further comprises an information retrieving server holding unit 45 and a retrieved information holding unit 46 in the additional information obtaining unit 4.

The information retrieving server holding unit 45 and retrieved information holding unit 46 store the same data as those stored by the information retrieving server specifying unit 31 and retrieval information specifying unit 32. Therefore, the information retrieving server holding unit 45 stores the data specifying the information retrieving server 101. Therefore, the information retrieving server holding unit 45 stores the data specifying the information retrieving server 101. The retrieved information holding unit 46 stores the data specifying the retrieved information.

Accordingly, the retrieval condition input unit 11 in the input/output unit 1 transmits the data specifying the information retrieving server 101 and the data specifying the retrieved information to the retrieved information obtaining unit 3 and additional information obtaining unit 4. When the additional information obtaining unit 4 receives the data from the retrieval condition input unit 11, the information retrieving server holding unit 45 stores the data specifying the information retrieving server 101 of the above described data, and the retrieved information holding unit 46 stores the data specifying the additional information in the above described data.

When the information server communicating unit 43 communicates with the information server 102 specified as in the first embodiment, the data stored by the information retrieving server holding unit 45 and retrieved information holding unit 46 are transmitted to the information server 102 together with the data stored by the additional information specifying unit 42.

When the information server 102 receives the data, it communicates with the information retrieving server 101 using the data specifying the information retrieving server 101 as shown in FIG. 13. Then, the information server 102 requests the information retrieving server 101 to retrieve the corresponding information using the data specifying the retrieved information, and obtains the retrieved information. The information server 102 analyzes the obtained retrieved information to properly select advertising information, selects the additional information (especially the advertising information) based on the retrieved information, and transmits it to the information retrieving apparatus 100, FIG. 13 shows the second aspect of the advertising system and information retrieving system according to the present invention. As shown in FIG. 13, the information server 102 automatically requests the information retrieving server 101 specified by the user to retrieve the user-specified retrieved information to obtain the retrieved information. The information server 102 automatically obtains the retrieved information each time additional information is obtained. Therefore, the user of the information retrieving apparatus 100 does not have to be aware of obtaining the information nor to pay any fee for the specification of retrieved information. The obtained retrieved information is used by the information server 102 to analyze what information the user is interested in.

FIG. 14 shows the flow of the information according to the second embodiment of the present invention. As shown in FIG. 14, the advertising function 104 of the information retrieving apparatus 100 can further comprise the information retrieving server holding unit 45 and retrieved information holding unit 46. When the advertising function 104 issues a request to obtain retrieved information to the WWW browser function 105 as described above, it requests the information server 102 specified by the information server specifying unit 41 to provide the additional information specified by the additional information specifying unit 42. The information server 102 retrieves the specified additional information and returns the corresponding additional information to the WWW browser function 105. Thus, the information server 102 is also an information retrieving apparatus. This holds true with the first embodiment. In this retrieval request, the advertising function 104 transmits the data stored by the information retrieving server holding unit 45 and retrieved information holding unit 46 and transmitted by the WWW browser function 105 to the information server 102.

According to the present embodiment, the attribute information of the user of the information retrieving apparatus 100 is used as the data specifying the additional information stored by the additional information specifying unit 42. The attribute information of the user can be the user's gender, age, income, company to which the user belongs, family, hobby, specialty, height, weight, etc.

For example, assume that the user is a young bachelor. When the user is obtaining the information about the sales conditions of the latest automobiles, the information server 102 obtains and analyzes the retrieval information to be obtained by the user, and recognizes that the information relates to the sales conditions of the latest automobiles. The information server 102 recognizes that the user is a young bachelor. Then, the information server 102 selects the advertising information about, for example, sports cars from a large volume of advertising information relating to automobiles, and transmits the selected information to the information retrieving apparatus 100. As a result, the advertising information in which the user may be interested can be transmitted to the user, thereby enhancing the advertising effect.

Especially when the retrieval information to be obtained by the user is information about the automobiles of manufacturer A and when the information server 102 (advertiser) is engaged in the same business (manufacturer B), the provided information is very instructive. That is, the advertising information about the manufacturer's automobile can be provided for the user who indicates a high probability of purchasing an automobile at the best timing. Therefore, the advertising information about the manufacturer's automobiles can be read by the user on the information display unit 13 of the information retrieving apparatus 100, and the information is compared with that of the automobile from manufacturer A, thereby possibly attracting the user's attention from manufacturer A to manufacturer B, that is, the information server.

Since the attribute information is stored by the additional information specifying unit 42 shown in FIG. 12, it is input by the user from the provided condition input unit 12 as in the first embodiment. The user can omit the input of the unnecessary item of the attribute information. To input the attribute information, the provided condition input unit 12 displays a predetermined input format on the information display unit 13 for easier input.

The information retrieving process is performed by the information retrieving apparatus 100 shown in FIG. 12 as in the information retrieving processes, basically performed by the information retrieving apparatus 100 shown in FIG. 2, as shown in FIGS. 7 through 11. In this process, a portion of the information retrieving processes shown in FIGS. 7 through 11 is altered to transmit the data stored by the information retrieving server holding unit 45 and retrieved information holding unit 46 to the information server 102.

FIG. 15 is a flowchart showing the retrieved information obtaining process, corresponds to FIG. 10, and shows the retrieved information obtaining process in S3 shown in FIG. 8. The name of the information retrieving server specified by the retrieval condition input unit 11 to retrieve information is stored by the retrieved information obtaining unit 3 in the information retrieving server specifying unit 31 and by the additional information obtaining unit 4 in the information retrieving server holding unit 45 (S51).

The retrieved information obtaining unit 3 and additional information obtaining unit 4 store respectively in the retrieval information specifying unit 32 and retrieved information holding unit 46 the description of the contents that is specified by the retrieval condition input unit 11 and is to be retrieved (S52).

Then, the processes in S53 through S55 are performed. Since these processes are similar to those in S33 through S35, the related descriptions are omitted here. In step S7 shown in FIG. 8, the process shown in FIG. 10 is performed as in the first embodiment.

FIG. 16 is a flowchart showing the information retrieving process according to the second embodiment, and shows the process of obtaining the additional information in S4 shown in FIG. 8.

The additional information obtaining unit 4 requests the information server 102 specified by the information server specifying unit 41 through the information server communicating unit 43 to provide the additional information specified by the additional information specifying unit 42. At this time, the additional information obtaining unit 4 adds to the request the contents of the information retrieving server holding unit 45 and retrieved information holding unit 46 and transmits them to the information server 102 (S61).

Then, the processes in S62 and S63 are performed. Since these processes are the same as those in S42 and S43 shown in FIG. 11, the related explanation is omitted here.

FIG. 17 shows an example of the configuration of the information server 102. The information server 102 comprises an additional information transmitting unit 6, a retrieving engine 7, an additional information database 8, an additional information use history database 9, and an information destination list 10.

The information server 102 is an independent data processing unit, and is connected to the Internet 103 as shown in FIG. 13. The information server 102 is not shown in FIG. 13, but comprises a CPU, memory, a program stored in the memory, a communications device, etc. The additional information transmitting unit 6 comprises a CPU, memory, an additional information transmitting program in the memory (including a retrieved information obtaining program and an additional information history management program), a communications device for communicating with an external device, etc. The retrieving engine 7 comprises a CPU, memory, and an additional information retrieving program in the memory. The additional information database 8 comprises memory and plural pieces of additional information stored in a predetermined format in the memory. The additional information use history database 9 comprises memory and a plurality of additional information use histories stored in a predetermined format in the memory. The information destination list 10 comprises memory and a plurality of information destinations stored in a predetermined format in the memory.

In FIG. 17, the additional information transmitting unit 6 comprises an additional information specifying unit 62, an information server communicating unit 63, an additional information storage unit 64, an information retrieving server holding unit 65, a retrieved information holding unit 66, a retrieved information storage unit 67, and a timer 68.

The additional information specifying unit 62 corresponds to the additional information specifying unit 42 of the information retrieving apparatus 100 shown in FIG. 12. The additional information transmitting unit 6 receives data specifying additional information from the information retrieving apparatus 100 through the information server communicating unit 63, and stores the data in the additional information specifying unit 62. In this embodiment, since the attribute information of the user of the information retrieving apparatus 100 is used as the data specifying the additional information, the additional information specifying unit 62 is an attribute information holding unit.

The information retrieving server holding unit 65 corresponds to the information retrieving server holding unit 45 shown in FIG. 12. The additional information transmitting unit 6 receives the data, which specifies the information retrieving server 101 and is added to the request to provide information, from the information retrieving apparatus 100 through the information server communicating unit 63, and stores the data in the information retrieving server holding unit 65. The information retrieving server holding unit 65 specifies the information retrieving server 101 according to the stored data for the information server communicating unit 63. After the communications through the information server communicating unit 63 according to the specification, the contents of the information retrieving server holding unit 65 are reset.

The retrieved information holding unit 66 corresponds to the retrieved information holding unit 46 shown in FIG. 12. The additional information transmitting unit 6 receives the data (attribute information) specifying the retrieved information added to the additional information from the information retrieving apparatus 100 through the information server communicating unit 63, and stores it in the retrieved information holding unit 66. The retrieved information holding unit 66 specifies the information to be retrieved according to the stored data for the information server communicating unit 63. After the communications through the information server communicating unit 63 according to the specification, the contents of the retrieved information holding unit 66 are reset.

The information server communicating unit 63 communicates with the information server communicating unit 43 shown in FIG. 12. That is, when the information server communicating unit 63 receives a request (to the information server 102) to provide information, it receives attribute information (specifying additional information) from the information retrieving apparatus 100, that is, the source of the request to provide the information, and transmits as a response to the request the additional information properly selected in a predetermined process to the information retrieving apparatus 100. At this time, the information server communicating unit 63 receives from the information retrieving apparatus 100 the attribute information, the data specifying the information retrieving server 101, and the data specifying the retrieved information.

According to the data specifying the information retrieving server 101 and the data specifying the retrieved information, the information server communicating unit 63 communicates with the information retrieving server 101. That is, after three pieces of data have been stored, the information server communicating unit 63 communicates with the information retrieving server 101 according to the specification by the information retrieving server holding unit 65 under the control of the additional information transmitting unit 6. The information server communicating unit 63 then requests the information retrieving server 101 to retrieve the information according to the specification by the retrieved information holding unit 66, and obtains the retrieved information. The information server communicating unit 63 stores the obtained retrieved information in the retrieved information storage unit 67. The retrieved information storage unit 67 comprises memory.

The feature of the response (obtaining the retrieved information through the information server 102) resides in automatically obtaining the information when a request to provide the information is input to the information server 102 through the information retrieving apparatus 100. That is, a retrieval request to the information retrieving server 101 which triggers the response is not input to the information retrieving apparatus 100 by the user, but is automatically issued by the additional information transmitting unit 6. The information retrieving server 101, that is, a communications unit, depends on the communications. The contents of the obtained retrieved information depend on the communications. That is, communications are automatically established with different communicators and contents of retrieved information each time communications are established.

After obtaining the retrieved information, the additional information transmitting unit 6 passes control to the retrieving engine 7 and requests it to retrieve additional information. At this time, the additional information transmitting unit 6 passes to the retrieving engine 7 the attribute information in the additional information specifying unit (attribute information holding unit) 62 and the retrieved information in the retrieved information storage unit 67. In response to this, the retrieving engine 7 searches the additional information database 8 using the attribute information and retrieved information and selects (extracts) the additional information properly corresponding to the attribute information and retrieved information. Then, the retrieving engine 7 stores the selected additional information in the additional information storage unit 64, and returns control to the additional information transmitting unit 6. The additional information storage unit 64 comprises memory.

The additional information transmitting unit 6 to which the retrieving engine 7 has returned control instructs the information server communicating unit 63 to communicate with the information retrieving apparatus 100, that is, the source of the request to provide information. In the communications, the additional information stored by the additional information storage unit 64 is transmitted by the information server communicating unit 63 to the information retrieving apparatus 100, that is, the source of the request, to provide the information. The additional information transmitting unit 6 or information server communicating unit 63 stores the information retrieving apparatus 100, that is, the source of the request, to provide the information until the additional information is transmitted.

When the retrieving engine 7 receives from the additional information transmitting unit 6 a request to retrieve additional information, it reads the attribute information in the additional information specifying unit 62 and the retrieved information in the retrieved information storage unit 67 as described above, and searches the additional information database 8 using the information.

The additional information database 8 stores plural pieces of additional information (advertising information) to be externally provided by the information server 102, and is managed by the retrieving engine 7. The advertising information is input by the advertiser of the information server 102 from the input/output unit (not shown in the figures) of the information server 102, and is stored by the retrieving engine 7 in a predetermined file in the additional information database 8. The advertising information normally comprises character information, voice information, image information, etc. The file in the additional information database 8 is provided for each piece of advertising information and stores the name of the advertising information, contents of the advertising information such as character information, etc., and a predetermined tag (or flag). The tag indicates the attribute of the advertising information. For example, the tags "automobile", "young", "bachelor", and "male" are added to the advertising information "sports car". It is obvious that the type and the number of tags are not limited to the above described examples.

The retrieving engine 7 reads the attribute information in the additional information specifying unit 62 and the retrieved information in the retrieved information storage unit 67. The attribute information in the advertising system is defined by predetermined tags or a set of flags which are the input by the user. Furthermore, a predetermined tag is added to the retrieved information in the advertising system.

For example, assume that the user is a young bachelor as described above, and the user is obtaining the information about the latest sales conditions as retrieved information. In this case, since the attribute information refers to a young bachelor, the attribute information is defined as a set of tags "young", "bachelor", and "male". Otherwise, the flags "young", "bachelor", and "male" are set in a predetermined flag table. Furthermore, since the retrieved information refers to the latest sales conditions of automobile, a tag "automobile" is added to the retrieved information. Thus, the retrieving engine 7 obtains a set of tags "young", "bachelor", "male", and "automobile".

The attribute information is interpreted (defined using a tag) by the retrieving engine 7. Therefore, the additional information specifying unit 62 stores the attribute information input without modification by the user. On the other hand, a tag for the retrieved information is preliminarily added to the retrieved information for the information retrieving server 101 (or the sender) according to the rules predetermined by the advertising system. As in interpreting the attribute information, a tag for the retrieved information can be generated by interpreting the retrieved information obtained by the additional information transmitting unit 6.

Next, the retrieving engine 7 selects appropriate advertising information from the advertising information stored in the additional information database 8. To attain this, a predetermined tag (or a flag) is added to the additional information in this advertising system.

For example, in the advertising information stored in the additional information database 8, the tags "automobile", "young", "bachelor", and "male" are added to the advertising information "sports car". Therefore, the retrieving engine 7 selects the advertising information "sports car" that is an item (advertising information) including all tags referring to "automobile" obtained from the retrieved information. That is, the item (advertising information) referred to by all tags is extracted. Thus, according to the attribute information and retrieved information, appropriate advertising information is selected.

For example, when the additional information database 8 contains only the advertising information having three tags of the above described four tags, the retrieving engine 7 selects the advertising information having three tags. If the additional information database 8 contains only the advertising information having five tags including the above described four tags, then the retrieving engine 7 selects the advertising information having five tags. If the additional information database 8 contains the advertising information having the above described four tags, then the priority level of the tag obtained from the attribute information can be enhanced to select by priority the advertising information having the tag obtained by the retrieving engine 7 from the attribute information. The inverse procedure can also be designed.

The interpretation of advertising information, that is, the definition using a tag, is performed by the information server 102 (or the advertiser thereof) by preliminarily adding a tag to the advertising information according to predetermined rules in the advertising system. That is, based on the contract between the advertiser and the advertising agent, it is preliminarily determined what additional information is transmitted when the user having specific attribute information retrieves information. Since it is determined by the advertiser, the advertiser has the final responsibility for the effect of the advertisement. On the other hand, the advertising agent as an advertising professional advises the advertiser to enhance the effect of the advertisement.

To further enhance the advertising effect, the additional information transmitting unit 6 periodically reads the contents (additional information use history) of the additional information use history storage unit 51 in the information retrieving apparatus 100 shown in FIG. 12 (or FIG. 2). To attain this, the additional information transmitting unit 6 comprises the timer 68, and the information server 102 comprises the additional information use history database 9 and information destination list 10. The timer 68 counts a predetermined time under the control of the additional information transmitting unit 6. The additional information use history database 9 and information destination list 10 comprise memory and are managed by the additional information transmitting unit 6.

The information destination list 10 enters the name of the information retrieving apparatus 100 to which the information server 102 transmits additional information. As described above, the information retrieving apparatus 100 contracts with the advertising agent server 102A while the advertising agent server 102A contracts with the information server 102. According to these contracts, the information server 102 transmits additional information to the information retrieving apparatus 100. Then, the advertising agent server 102A transmits the information destination list 10 to the information server 102 through the Internet 103. The information destination list 10 is a list of the names of the information retrieving apparatus 100 (or the www browsers) which receives the additional information from the information server 102 according to the contract with the advertising agent server 102A.

The additional information use history database 9 is a database storing am additional information use history in a predetermined storage format. The additional information use history database 9 is generated by the additional information transmitting unit 6 according to the information destination list 10. The file of the additional information use history database 9 is generated for each information retrieving apparatus 100 and stores a use history of the additional information of the information retrieving apparatus 100 corresponding to the name of the information retrieving apparatus 100 which receives additional information from the information server 102.

The information destination list 10 is updated as necessary. That is, when the contract is made or discarded between the information retrieving apparatus 100 and the advertising agent server 102A, the advertising agent server 102A transmits the latest information destination list 10 to the information server 102. This update process is performed through the communications between the advertising agent server 102A and the information server 102. When the updated information destination list 10 is received, the additional information transmitting unit 6 updates the additional information use history database 9 such that it corresponds to the updated information destination list 10. That is, a new entry is generated or an existing entry is deleted.

When the timer 68 counts a predetermined number, the additional information transmitting unit 6 refers to the information destination list 10 and requests each of the information retrieving apparatuses 100 entered in the information destination list 10 to read an additional information use history through the information server communicating unit 63 and Internet 103. As a result, the information server 102 periodically (for example, every minute, every hour, every day, every week, etc.) recognizes the use conditions of the additional information. Since this read request is issued according to the information destination list 10 which is updated as necessary, the information server 102 can recognize the use conditions of the additional information about the latest information retrieving apparatus 100.

The information retrieving apparatus 100 (the additional information use history management unit 5) which received a request to read the additional information use history transmits the actual additional information use history of the user stored by its additional information use history storage unit 51 to the information server 102 through the Internet 103. At this time, the additional information use history management unit 5 searches the additional information use history storage unit 51 using the name of the information server 102 which issued the read request.

The additional information transmitting unit 6 that received an additional information use history from the information retrieving apparatus 100 enters it in the entry of the additional information use history database 9 about the information retrieving apparatus 100. Thus, the additional information use history database 9 sequentially accumulates private histories of the additional information. As described above, the additional information use history includes the data of, for example, an object use, user, time, use level, etc. Therefore, the information server 102 (advertiser) can analyze when the information is provided, who has provided the information, what information has been provided, and how the information was provided. The information server 102 can correctly recognize the advertising effect according to the analysis result. To easily analyze the advertisement effect, the attribute information of the user can be preliminarily stored for each name of the information retrieving apparatus 100.

The additional information transmitting process by the information server shown in FIG. 17 is described below by referring to FIGS. 18 through 20. FIGS. 18 through 20 show a general additional information transmitting process, and also show the additional information transmitting process performed by the information server 102 shown in FIG. 17.

As shown in FIG. 18, the additional information transmitting unit 6 checks in step S71 whether or not the information server communicating unit 63 has received a request to provide information (additional information) from a unit (information retrieving apparatus 100) external to the information server 102.

If it has received the request to provide information, then the additional information transmitting unit 6 performs the processes in steps S73 through S78. The processes are described later by referring to FIG. 19.

If it has not received the request to provide information, then the additional information transmitting unit 6 checks whether or not it is time to obtain the additional information use history (S72). That is, it is checked whether or not the timer 68 indicates the predetermined time has elapsed.

When it is time to obtain the additional information use history, the additional information transmitting unit 6 performs the processes in steps S79 through S82. The processes are described later by referring to FIG. 20.

When it is not time to obtain the additional information use history, the additional information transmitting unit 6 repeats the processes in and after S71.

In step S73 as shown in FIG. 19, the additional information transmitting unit 6 extracts the data specifying the information retrieving server 101 from the request to provide information and stores the data in the information retrieving server holding unit 65, extracts the data specifying the retrieved information from the request to provide information and stores the data in the retrieved information holding unit 66, and extracts the user attribute information from the request to provide information and stores the data in the additional information specifying unit (attribute information holding unit) 62.

Next, the additional information transmitting unit 6 issues a request to retrieve information (retrieved information) specified by the retrieved information holding unit 66 to the information retrieving server 101 specified by the information retrieving server holding unit 65 through the information server communicating unit 63 (S74).

The additional information transmitting unit 6 checks whether or not the process by the information retrieving server 101 has been completed (S75). If not, the process in S75 is repeated.

When the process is completed, the additional information transmitting unit 6 obtains the retrieved information from the information retrieving server 101 through the information server communicating unit 63 and stores the obtained information in the retrieved information storage unit 67 (S76).

Then the retrieving engine 7 refers to the contents (attribute information) of the additional information specifying unit 62 and the contents (retrieved information) of the retrieved information storage unit 67, searches the additional information database 8, and stores retrieved data (appropriate advertising information) in the additional information storage unit 64 (S77).

The additional information transmitting unit 6 transmits the contents (appropriate advertising information) of the additional information storage unit 64 to the source of the request to provide information (external information retrieving apparatus 100) through the information server communicating unit 63 (S78). Then, the processes in and after S72 (shown in FIG. 18) are repeated.

In step S79 as shown in FIG. 20, the additional information transmitting unit 6 first restarts the timer 68, and then requests each of the information retrieving apparatuses 100 described on the information destination list 10 to read an additional information use history through the information server communicating unit 63. That is, it requests each of the information retrieving apparatuses 100 to record data in the additional information use history database 9.

The additional information transmitting unit 6 checks whether or not it has received responses from all information retrieving apparatuses 100 (S80). If it has, the processes in and after S71 shown in FIG. 18 are repeated.

When it has not received all responses, it is then checked whether or not it has received a response from any of the information retrieving apparatuses 100 (S81). If it has not received a response from any of the information retrieving apparatuses 100, then the process in S81 is repeatedly performed.

If a response is received from any of the information retrieving apparatuses 100, then the additional information transmitting unit 6 receives an additional information use history from the information retrieving apparatus 100 through the information server communicating unit 63, and stores the additional information use history in the additional information use history database 9 (S82). Then, the information retrieving apparatus 100 from which the response is received is removed from the process objects, and the processes in and after step S80 are repeated.

In the present embodiment, the retrieved information (updated document 108) is obtained by the information retrieving apparatus 100 as in the first embodiment. Therefore, the process of obtaining the retrieved information performed by the information server 102 is not viewed or recognized by the user. The user only obtains desired retrieved information and advertising information. The user is not aware that the advertising information has been appropriately selected.

Figure 21:
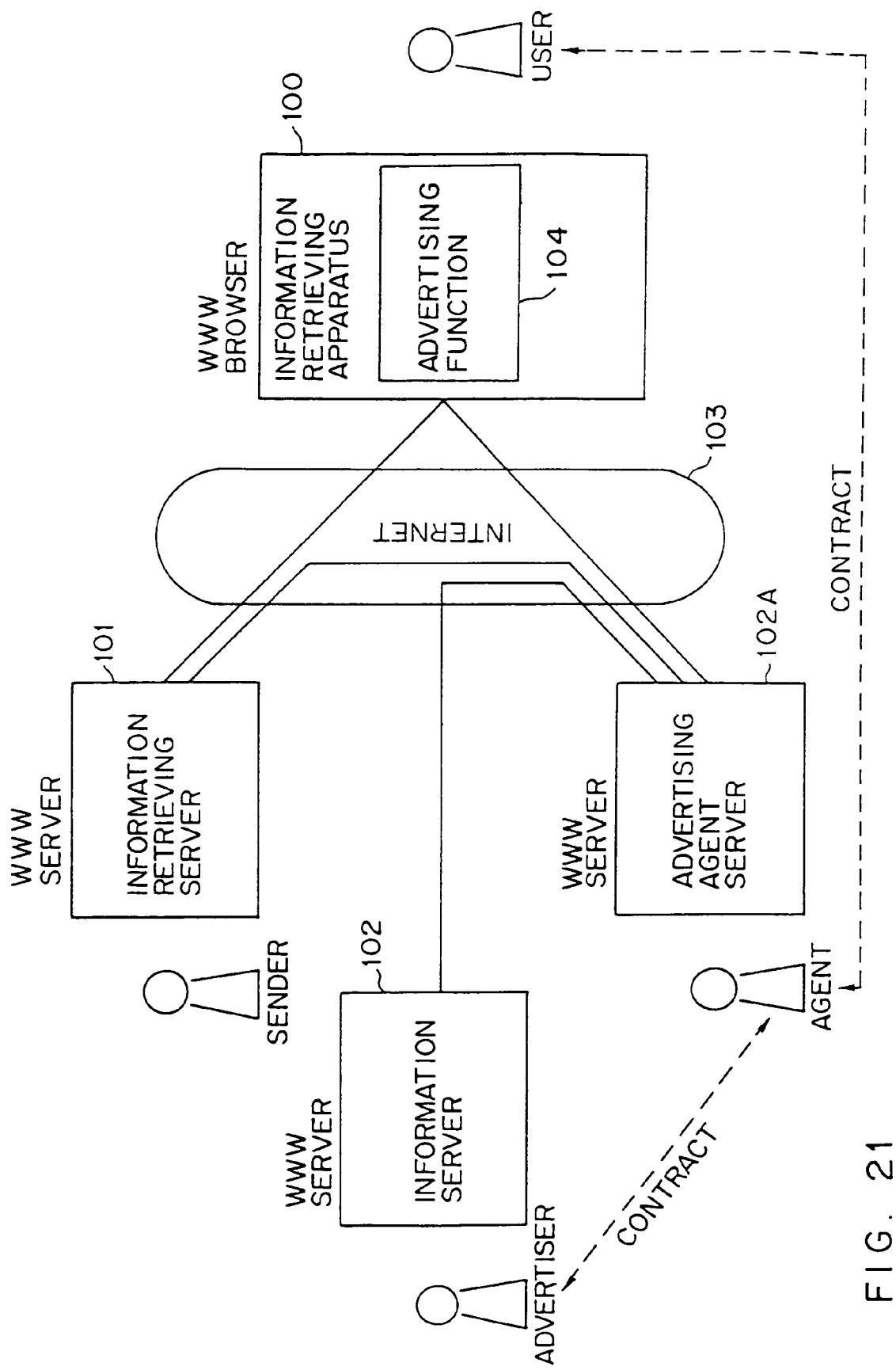
FIG. 21 shows the third information retrieving system using the information retrieving apparatus according to the present invention.

According to the present embodiment, the advertising agent server 102A may be added in addition to the information server 102, as shown in FIG. 21. When the information retrieving apparatus 100 obtains retrieved information from the information retrieving server 101, the information server communicating unit 43 of the information retrieving apparatus 100 accesses the advertising agent server 102A instead of the information server 102.

In this case, FIG. 17 shows the configuration of the advertising agent server 102A. Therefore, the advertising agent server 102A accesses the information retrieving server 101 to obtain the retrieved information and selects the additional information based on the retrieved information, and transmits the additional information to the information retrieving apparatus 100. The additional information is preliminarily transmitted from the information server 102 to the advertising agent server 102A through the Internet 103. That is, the advertising agent server 102A preliminarily comprises the additional information (advertising information) provided for an external device by the information server 102 with which the advertising agent server 102A has contracted.

In this case, the user's attribute information and additional information use history are transmitted only to the advertising agent server 102A, and not to the information server 102. Therefore, the privacy of the user can be sufficiently protected.

When a request to provide information is issued from the information retrieving apparatus 100, the advertising agent server 102A accesses the information server 102 to obtain the additional information. At this time, the additional information database 8 in the advertising agent server 102A is designed to store only the name of additional information (advertising information) and a predetermined tag, but not to store the contents of the additional information about character information, etc. Thus, the additional information can be appropriately selected with the data size of the additional information database 8 successfully reduced.

According to the present embodiment, the additional information specifying unit 42 can be omitted as shown in FIG. 22. That is, the information server specifying unit 41 is required to access the information server 102 (or advertising agent server 102A). At this time, the additional information specifying unit 42, information retrieving server holding unit 45, and the retrieved information holding unit 46 can be selectively provided. In the case shown in FIG. 22, the applicability of the additional information obtained by the information retrieving apparatus 100 to the user's interest may be reduced due to a lack of contents (attribute information) of the additional information specifying unit 42. However, it is enhanced to a certain level depending on the contents of the retrieved information server holding unit 45 and the retrieved information holding unit 46.

Furthermore, according to the present embodiment, the additional information use history database 9 and information destination list 10 can be omitted. Practically, they can be omitted in either the information server 102 or advertising agent server 102A, or in both of them. Otherwise, they can be provided in both information server 102 and advertising agent server 102A.

The embodiments of the present invention have been described above, but the present invention is not limited to the above listed embodiments and other variations according to the spirit of the present invention should be understood within the range of the present invention.

For example, the apparatus and system according to the present invention can comprise plural sets of the information server specifying units 41 and additional information specifying units 42. In this case, the user can specify different pieces of additional information to be obtained from respective information servers 102. Therefore, different pieces of specified additional information are displayed each time the retrieved information is obtained. Thus, the user can avoid repeatedly viewing the same additional information. Therefore, the advertising effect can be improved and different additional information can be displayed even if plural pieces of retrieved information are obtained within a short time.

Additional information can be obtained before retrieved information is obtained. That is, in FIG. 8, the process in S4 can be performed before the process in S3. When the processes in S3 and S4 shown in FIG. 8 are performed in parallel, the process in S41 shown in FIG. 11 can be performed between the processes in S31 and S32 in FIG. 10, and the process in S33 can be performed during the process of S42

Additional information can also be displayed at a specified time at the start or end of access without being incorporated into retrieved information. In this case, it is desired that the additional information is displayed in response to the input of the user.

Since the additional information use history storage unit 51 uses the memory of the information retrieving apparatus 100, an additional information use history can be transmitted to the information server 102 or the advertiser's server each time additional information is used. That is, the additional information use history management unit 5 can be provided in the information server 102 or the advertiser's server.

In this case, especially in the second embodiment, the additional information use history is written to the additional information use history database 9 provided in the information server 102 or advertising agent server 102A.

According to the first embodiment, the data specifying the additional information held by the additional information specifying unit 42 can be user's attribute information described in the second embodiment. Since the attribute information is useful in roughly selecting required additional information, it has general-purpose properties as data specifying the additional information.

Figure 23:
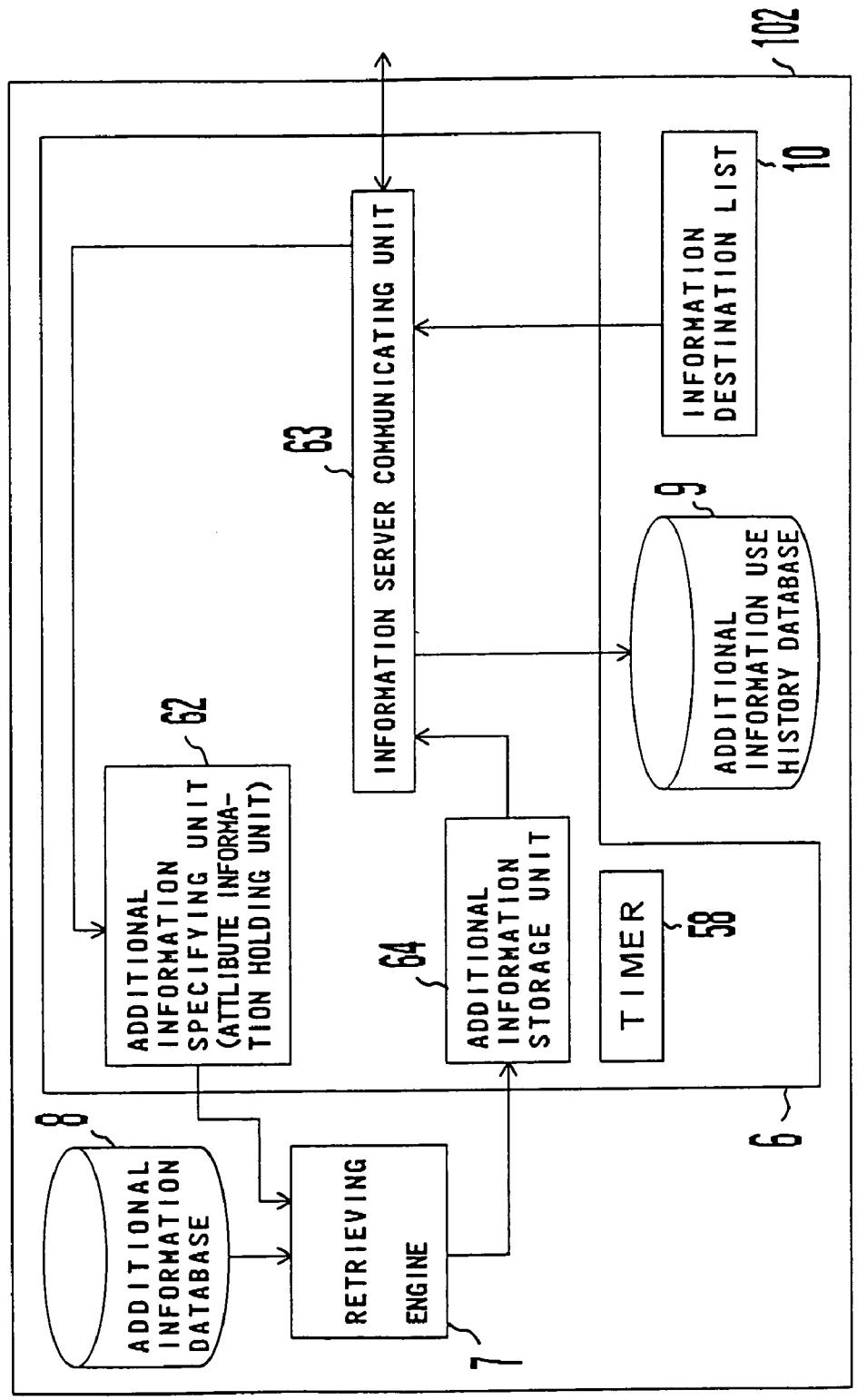
FIG. 23 shows the configuration of the second information server according to the present invention.

For the first embodiment, the configuration of the information server 102 shown in FIG. 23 may be used. It corresponds to the information server 102 shown in FIG. 17 without the information retrieving server holding unit 65, retrieved information holding unit 66, and retrieved information storage unit 67.

For the first embodiment, the information retrieving apparatus 100 may obtain additional information from the advertising agent server 102A instead of the information server 102. That is, in the first embodiment as well as the second embodiment, the information sever 102 may be replaced with the advertising agent server 102A. In this case, the system corresponds to the systems shown in FIGS. 3 and 21 in which the communications between the information retrieving server 101 and advertising agent server 102A are omitted. Therefore, the advertising agent server 102A preliminarily obtains additional information from the information server 102 when or before it is accessed from the information retrieving apparatus 100. That is, the additional information can be obtained from the information server 102, from the advertising agent server 102A, or by accessing the information server 102 through the advertising agent server 102A.

An advertising system according to the first embodiment can be provided together with an advertising system according to the second embodiment. For example, one of the information servers 102 or advertising agent servers 102A is a server for transmitting additional information as shown in FIG. 3 while another information server 102 or advertising agent server 102A is a server for transmitting additional information as shown in FIG. 21. In this case, the advertising system can be selected by the user. That is, in the information retrieving apparatus 100, the configuration in FIGS. 2, 12, or 22 can be optionally selected. When the information server 102 or advertising agent server 102A is a server for supporting any of the configurations above, the information retrieving apparatus 100 does not have to be aware of obtaining the additional information. That is, the additional information can be obtained from any information server 102 or advertising agent server 102A.

Figure 24:
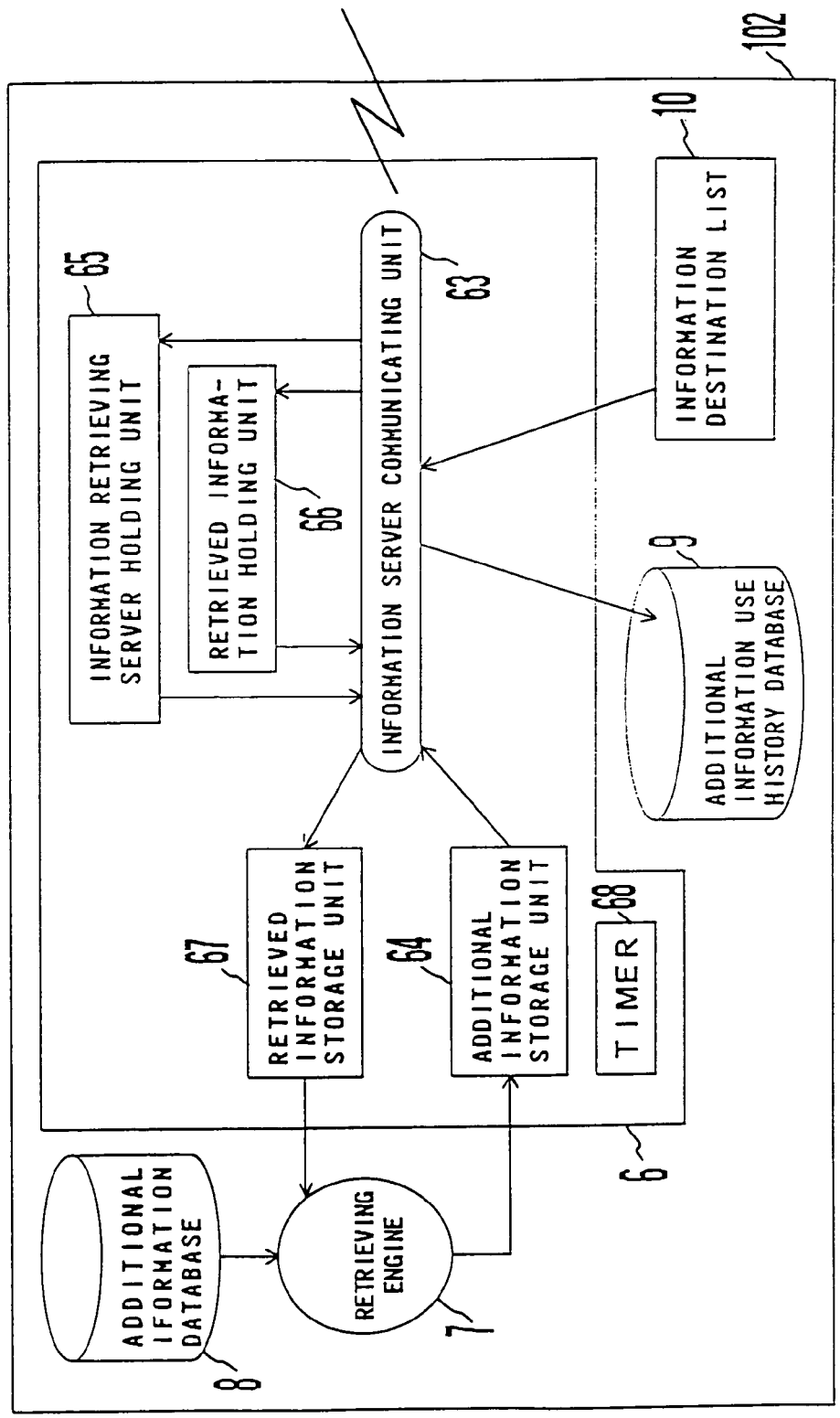
FIG. 24 shows the configuration of the third information server according to the present invention.

FIG. 24 shows the configuration of the third information server according to the present invention. The information server 102 corresponds to the information retrieving apparatus 100 shown in FIG. 22, and also equals the information server 102 shown in FIG. 17 without the additional information specifying unit 62.

Next, rewarding and accounting systems according to the present invention are described. A reward is paid from an advertising agent to a user (owner of the information retrieving apparatus) for viewing the advertising information, and can be paid with money, goods, or services. An account is paid from an information provider (owner of the additional information server) to an advertising agent for an advertizing service, and is paid according to a bill issued from the advertising agent to the information provider.

Figure 25:
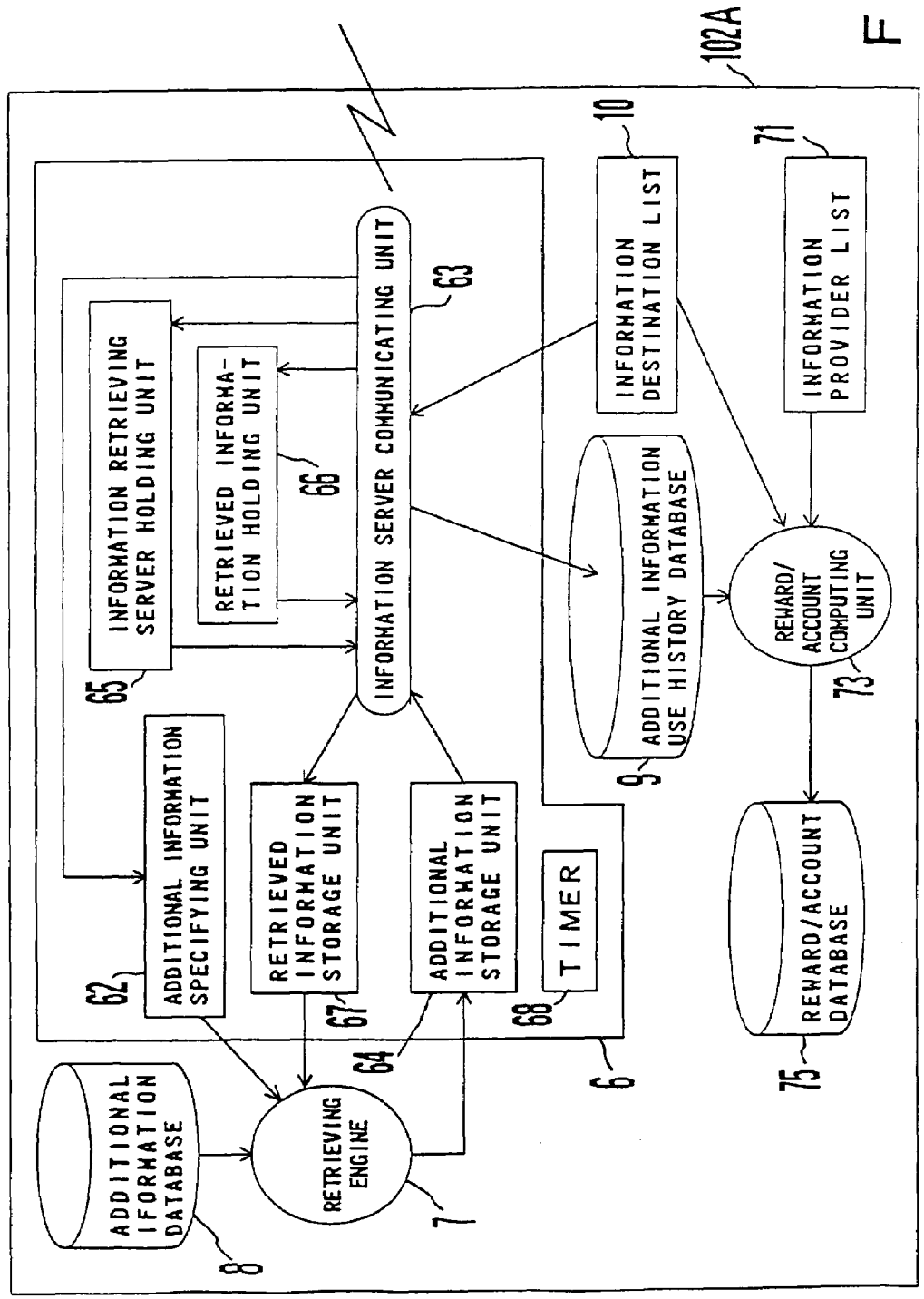
FIG. 25 shows the configuration of the advertising agent server according to the present invention.

FIG. 25 shows an example of the advertising agent server when the reward and account systems are realized.

As shown in FIG. 25, the advertising agent server 102A comprises, in addition to the information server 102 shown in FIG. 17, an information provider list 71, a reward/account computing unit 73, and a reward/account database 75. All the units other than the information provider list 71, reward/account computing unit 73, and reward/account database 75 are the same as those in the information server 102 shown in FIG. 23 or FIG. 24. Furthermore, an advertising agent server can be realized by adding the information provider list 71, reward/account computing unit 73, and reward/account database 75 to the information server 102 shown in FIGS. 17, 23, or 24.

The information provider list 71 is a list of additional information servers contracting with the advertising agent. The reward/account computing unit 73 computes a reward and account using the information destination list 10, information provider list 71, and additional information use history database 9, and records the computation results in the reward/account database 75.

Figure 26:
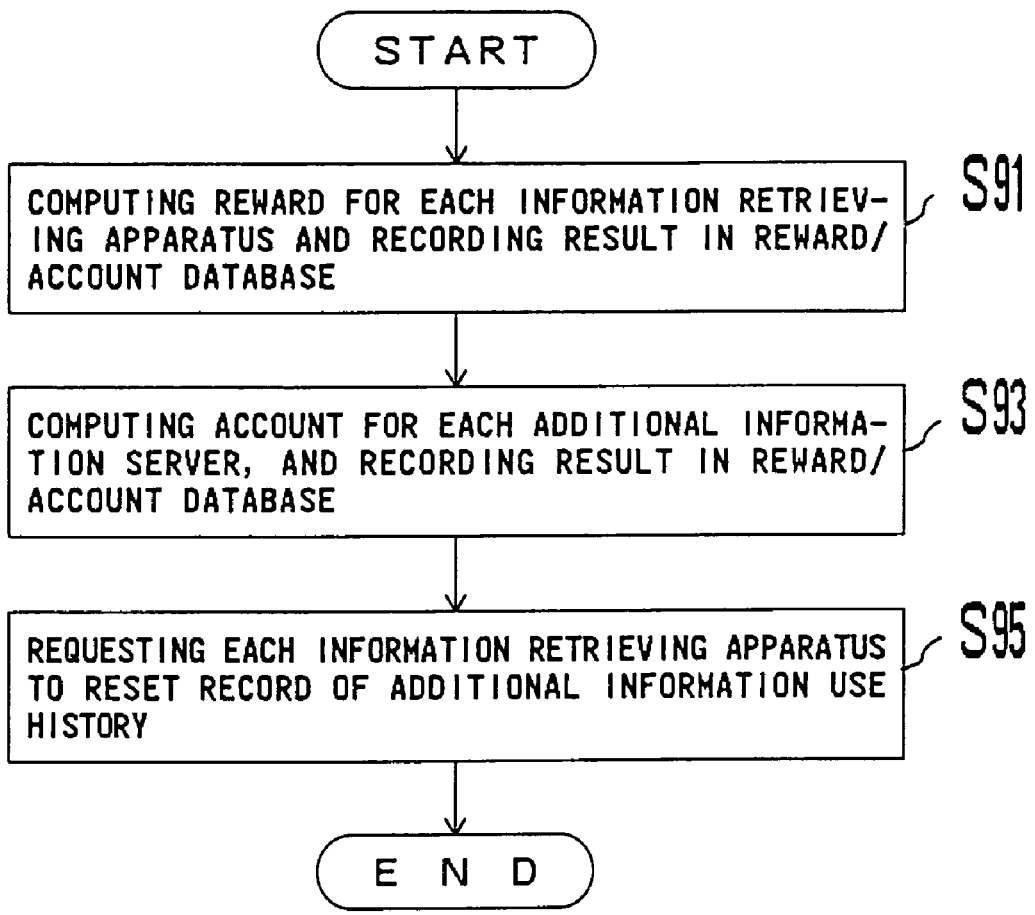
FIG. 26 is a flowchart showing the rewarding and accounting process according to the present invention.

FIG. 26 is a flowchart showing the rewarding and accounting systems. As shown in FIG. 26, the reward/account computing unit 73 refers to the additional information use history database 9 for each information retrieving apparatus of an information receiver recorded on the information destination list 10, computes the reward based on the stored additional information use history, and records the computation result in the reward/account database 75 (step S91). Then, the reward/account computing unit 73 refers to the additional information use history database 9 for each additional information server of an information provider recorded on the information provider list 71, computes the account according to the recorded additional information use history, and records the computation result in the reward/account database 75 (step S92). Then, the reward/account computing unit 73 instructs the information retrieving apparatus of the information receiver recorded on the information destination list 10 to reset the recorded contents of the additional information use history storage unit 51 through the information server communicating unit 63. Thus, the recorded contents of the additional information use history storage unit 51 of the information retrieving apparatus 100 are reflected on the reward/account database 75 of the advertising agent server 102A, and the recorded contents of the additional information use history storage unit 51 are reset.

The recorded contents of the additional information use history storage unit 51 of the information retrieving apparatus 100 are read to the additional information use history database 9 at proper intervals, and the recorded contents are updated. Thus, preventive action is taken against, for example, the failure, in reading data, of the additional information use history recording unit due to an accident with the information retrieving apparatus 100. Based on the contents of the above described recorded reward and account database, a reward is paid to the user and an information provider is charged for the information.

Figure 27:
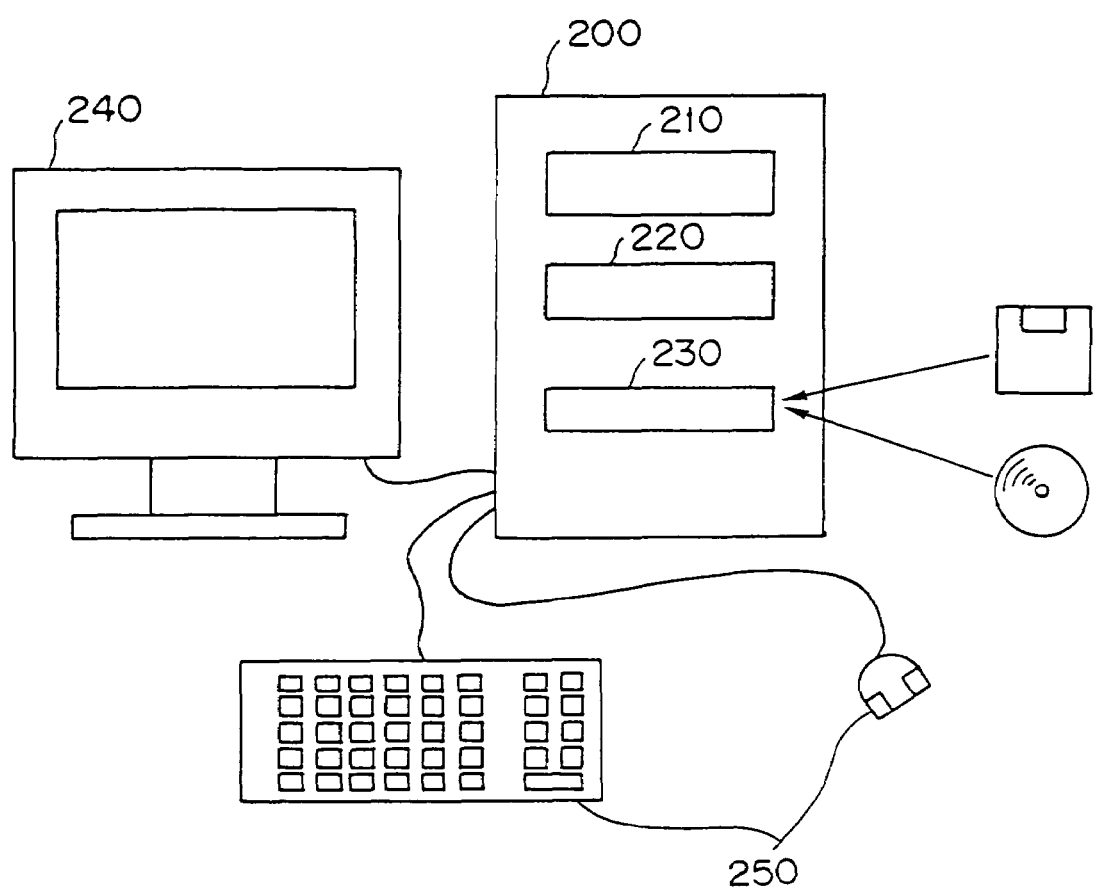
FIG. 27 shows an example of the computer system for realizing the present invention.

FIG. 27 shows an example of a computer system for realizing the present invention.

The computer system comprises computer 200, a display 240, and an input device 250. The computer 200 comprises a processor 210, memory 220, and a driver 230 for the storage media.

The information retrieving and providing processes and the rewarding and accounting processes according to the present invention can be realized by a computer program. The computer program is stored on magnetic storage media, optical storage media, or optical magnetic storage media such as a floppy disk, CD-ROM, MD. These storage media are stored in the computer as the memory 220 or driven by the driver 230, and the stored program is read by the computer 200. By executing the computer program, the computer system functions as the above described information retrieving apparatus, information server, and advertising agent server. At this time, the functions of the units other than the information retrieving apparatus and the units for the recording functions in the servers are realized by the processor 210. The retrieved information and additional information (advertising information) are output to the display 240. Units for recording data are realized by the above described storage media.

According to the present invention, when retrieved information is obtained in the information retrieving apparatus and the information retrieving system using the apparatus for obtaining the retrieved information from the information retrieving server, that is, a WWW server through the Internet, additional information such as advertising information is automatically obtained from the information server, that is, a WWW server, and incorporated into the retrieved information when the data is input to obtain the retrieved information. Thus, it is not required to store the additional information in each information retrieving server, or to complete the process at the terminal of the server, thereby allowing the user to perform a desired process at the terminal of the information retrieving apparatus (at the terminal of a client). As a result, the information server can transmit to the user the additional information such as advertising information even if the user does not access a retrieving server for specified information. Furthermore, if the user preliminarily selects the advertising information, it will be useful for the user. Accordingly, an advertising effect can be successfully obtained even if access is concentrated on a specified information retrieving server, and therefore the information retrieving apparatus according to the present invention can be widely applied to advertisements on the WWW. Thus, the advertising system can be used for the WWW. At this time, the user of useful information transmitted through the Internet is charged for the information, thereby reducing the fee for the information.

What is claimed is:

1. An information providing method to provide information through an information communications network, comprising:

receiving retrieval information for a user through the information communications network, wherein the retrieval information is retrieved by an information retrieving server based on retrieval condition data in response to a request to obtain the retrieval information;

selecting one piece of advertising information from among plural pieces of stored advertising information each assigned a predetermined tag corresponding to attributes of the advertising information, according to the retrieval information, wherein the advertising information is automatically retrieved by an advertising information server and only in response to the receiving of the retrieval information and based on provided condition data corresponding to attributes of the user in response to the request to obtain the retrieval information, wherein the selected advertising information corresponds to attributes of the user; and transmitting the selected advertising information to the user through the information communications network, wherein said retrieval information includes one of information selected by the user from among plural selection items, information on another server requested by the user to provide information, and information requested by the user to another server, wherein another predetermined tag is added to the provided condition data to retrieve advertising information, and is derived from the retrieval information.

2. An information retrieving method to obtain required information through an information communications network, comprising:

inputting retrieval condition data to obtain retrieval information to an information retrieving apparatus connected to the information communications network;

inputting provided condition data corresponding to attributes of a user to obtain advertising information to the information retrieving apparatus to be displayed to the user;

requesting an information retrieving server connected to the information communications network to provide the retrieval information based on the retrieval condition data;

automatically requesting an advertising information server connected to the information communications network to provide the advertising information which is stored based on predetermined tags corresponding to attributes of the advertising information, only in response to the inputting of the retrieval condition data and based on the provided condition data when the retrieval condition data is input wherein the advertising information provided corresponds to the attributes of the user;

transmitting the retrieval information from the information retrieving server to the information retrieving apparatus in response to a request to transmit the retrieval information from the information retrieving apparatus;

transmitting the advertising information from the advertising information server to the information retrieving apparatus in response to a request to transmit the advertising information from the information retrieving apparatus;

incorporating in the information retrieving apparatus the advertising information transmitted from the advertising information server to the retrieval information transmitted from the information retrieving server; and displaying in the information retrieving apparatus the retrieval information into which the advertising information is incorporated, wherein said requesting to provide the retrieval information, said requesting to provide the advertising information, said transmitting the retrieval information, said transmitting the advertising information, said incorporating, and said displaying are performed automatically and only in response to a request to obtain the retrieval information, wherein another predetermined tag is added to the provided condition data to retrieve advertising information, and is derived from the retrieval information.

3. An information retrieving method to obtain required information through an information communications network, comprising:

obtaining, using retrieval condition data, retrieval information from an information retrieving server connected to the information communications network, wherein the retrieval information is retrieved by the information retrieving server based on the retrieval condition data;

automatically obtaining, only in response to the retrieval condition data and based on provided condition data corresponding to attributes of a user, advertising information from a predetermined advertising information server connected to the information communications network, wherein the advertising information is stored based on predetermined tags corresponding the attributes of the advertising information, and the stored advertising information is retrieved by the advertising information server based on the provided condition data, wherein the retrieved advertising information corresponds to the attributes of the user;

incorporating the obtained advertising information into the obtained retrieval information; and displaying the retrieval information into which the advertising information is incorporated, wherein said obtaining retrieval information and said obtaining advertising information are automatically performed and only in response to a request to obtain the retrieval information, wherein another predetermined tag is added to the provided condition data to retrieve advertising information, and is derived from the retrieval information.

4. The information retrieving method according to claim 3, further comprising:

selecting by the user the provided condition data from among plural selection items.

5. The information retrieving method according to claim 3, further comprising:

selecting by the user specification data from the advertising information displayed; and obtaining detailed information through the information communications network based on the selected specification data, wherein the detailed information relates to information about the advertising information.

6. The information retrieving method according to claim 3, further comprising:

inputting and storing the provided condition data to obtain the advertising information;

inputting the retrieval condition data to obtain the retrieval information; and issuing the request to obtain the retrieval information when the retrieval condition data is input.

7. An information retrieving system to communicate information through an information communications network, comprising:

an information retrieving server retrieving retrieval information based on retrieval condition data;

an advertising information server comprising advertising information stored based on a plurality of predetermined tags corresponding to attributes of the advertising information, and automatically providing stored advertising information based on provided condition data corresponding to attributes of a user, wherein the advertising information automatically provided corresponds to the attributes of the user and is responsive only to the retrieval condition data; and an information retrieving apparatus receiving the retrieval information from the information server through the information communications network, receiving the advertising information from the advertising information server through the information communications network incorporating the advertising information into the retrieval information, and displaying the retrieval information into which the advertising information is incorporated, wherein only in response to a request to obtain the retrieval information, the information retrieving server retrieves the retrieval information and the advertising information server provides the advertising information automatically based upon the retrieval condition data, wherein another predetermined tag is added to the provided condition data to retrieve advertising information, and is derived from the retrieval information.

8. The information retrieving system according to claim 7, wherein said information retrieving apparatus comprises:

an input unit inputting retrieval condition data to obtain the retrieval information and provided condition data to obtain the advertising information;

a retrieval information obtaining unit obtaining the retrieval information from said information retrieving server based on the retrieval condition data;

an advertising information obtaining unit obtaining the advertising information from said advertising information server based on the provided condition data;

an information converting unit incorporating the obtained advertising information into the obtained retrieval information; and a display unit displaying the retrieval information into which the advertising information is incorporated by said information converting unit.

9. The information retrieving system according to claim 8, wherein said information retrieving apparatus issues a request to provide the advertising information to said advertising information server together with the retrieval condition data in order to obtain the advertising information; and said advertising information server obtains the retrieval information from said information retrieving server using the retrieval condition data, selects advertising information according to the obtained retrieval information and provided condition data, and transmits the selected advertising information to said information retrieving apparatus.

10. The information retrieving system according to claim 7, wherein
said advertising information server comprises:
an advertising information data-base unit storing advertising information;
a retrieving unit retrieving the advertising information stored in said advertising information data-base unit; and
an advertising information transmitting unit receiving advertising information specifying data the advertising information from the information retrieving apparatus through the information communications network, and outputting the advertising information retrieved by said retrieving unit according to the advertising information specifying data to said information retrieving apparatus.

11. The information retrieving system according to claim 7, wherein
said information communications network is the Internet;
said information retrieving apparatus is a WWW browser; and
said information retrieving server is a WWW server.

12. An information retrieving system to communicate information through an information communications network, comprising:
an information retrieving server retrieving retrieval information based on retrieval condition data;
an advertising information server comprising advertising information stored based on predetermined tags corresponding to attributes of the advertising information, and automatically providing stored advertising information based on provided condition data corresponding to attributes of a user, wherein the advertising information automatically provided corresponds to the attributes of the user, and is responsive only to the retrieval condition data;
an advertising agent server transmitting the advertising information instead of said advertising information server; and
an information retrieving apparatus receiving the retrieval information from the information server through the information communications network, receiving the advertising information from the advertising agent server through the information communications network incorporating the advertising information into the retrieval information, and displaying the retrieval information into which the advertising information is incorporated, wherein only in response to a request to obtain the retrieval information, the information retrieving server retrieves the retrieval information and the advertising agent server automatically provides the advertising information, wherein another predetermined tag is added to the provided condition data for retrieving advertising information, and is derived from the retrieval information.

13. The information retrieving system according to claim 12, wherein
said information retrieving apparatus issues a request to provide the advertising information to said advertising agent server together with the retrieval condition to obtain the retrieval information, to obtain the advertising information; and
said advertising agent server obtains the retrieval information from said information retrieving server based on the retrieval condition data, selects advertising information according to the obtained retrieval information and provided condition data to obtain the advertising information, and transmits the selected advertising information to said information retrieving apparatus.

14. The information retrieving system according to claim 12, wherein
said advertising agent server preliminarily obtains the advertising information from said advertising information server through the information communications network.

15. The information retrieving system according to claim 12, wherein
said information communications network is the Internet;
said information retrieving apparatus is a WWW browser; and
said information retrieving server and said advertising agent server are WWW servers.

16. A computer storage medium storing and executing a computer program to perform an information retrieving method to obtain required information through an information communications network, said method comprising:
obtaining retrieval information from an information retrieving server connected to the information communications network based on retrieval condition data, wherein the retrieval information is retrieved by the information retrieving server based on the retrieval condition data;
automatically obtaining advertising information from a predetermined advertising information server connected to the information communications network, wherein the advertising information is stored based on predetermined tags corresponding to the advertising information, only in response to the retrieval condition data and based on provided condition data corresponding to attributes of the user, wherein the advertising information is retrieved by the advertising information server based on the provided condition data such that wherein the retrieved advertising information corresponds to the attributes of the user;
incorporating the obtained advertising information into the obtained retrieval information; and
displaying the retrieval information into which the advertising information is incorporated, wherein
said obtaining retrieval information, said obtaining advertising information, said incorporating, and said displaying are performed automatically and only in response to a request to obtain the retrieval information, wherein another predetermined tag is added to the provided condition data to retrieve advertising information, and is derived from the retrieval information.

17. A computer storage medium storing and executing a computer program to perform an information providing method to provide information through an information communications network, said method comprising:
receiving retrieval information for a user through the information communications network, wherein the retrieval information is retrieved by an information retrieving server based on retrieval condition data in response to a request to obtain the retrieval information;
automatically selecting one piece of advertising information from among plural pieces of stored advertising information comprising predetermined tags corresponding to attributes of the advertising information, only in response to and according to the retrieval information, wherein the advertising information is retrieved by an advertising information server based on provided condition data corresponding to attributes of the user, in response to the request to obtain retrieval information wherein the selected advertising information corresponds to the attributes of the user; and transmitting the selected advertising information to the user through the information communications network, wherein said retrieval information includes one of information selected by the user from among plural selection items, information on another server requested by the user to provide information, and information requested by the user to another server, wherein another predetermined tag is added to the provided condition data to retrieve advertising information, and is derived from the retrieval information.

18. An information retrieving apparatus to obtain required information through an information communications network, comprising:

an input unit inputting retrieval condition data to obtain retrieval information through the information communications network and provided condition data corresponding to attributes of a user, to obtain advertising information through the information communications network to be displayed to the user;

a retrieval information obtaining unit obtaining, only in response to the inputting of the retrieval condition data and based on the retrieval condition data, the retrieval information from an information retrieving server connected to the information communications network, wherein the retrieval information is retrieved by the information retrieving server based on the retrieval condition data;

an advertising information obtaining unit automatically obtaining, only in response to the inputting of the retrieval condition data and based on the provided condition data, the advertising information from a predetermined advertising information server connected to the information communications network wherein the advertising information is assigned predetermined tags corresponding to attributes of the advertising information, wherein the advertising information is retrieved by the advertising information server based on the provided condition data wherein the retrieved advertising information corresponds to the attributes of the user;

an information converting unit incorporating the advertising information obtained by said advertising information obtaining unit into the retrieval information obtained by said retrieval information obtaining unit, in response to the inputting of the retrieval condition data; and a display unit displaying the retrieval information into which the advertising information is incorporated by said information converting unit, wherein only in response to the inputting of the retrieval condition data, said retrieval information obtaining unit obtains the retrieval information, said advertising information obtaining unit automatically obtains the advertising information, said information converting unit incorporates the obtained advertising information into the obtained retrieval information, and the display unit displays the retrieval information into which the advertising information is incorporated, wherein another predetermined tag is added to the provided condition data to retrieve advertising information, and is derived from the retrieval information.

19. The information retrieving apparatus according to claim 18, wherein said retrieval condition data includes information retrieving server specifying data about the information retrieving server and retrieval information specifying data about the retrieval information;

said provided condition data includes advertising information server specifying data about the advertising information server and advertising information specifying data about the advertising information;

said retrieval information obtaining unit comprises:

an information retrieving server specifying unit specifying the information retrieving server according to the information retrieving server specifying data, a retrieval information specifying unit specifying the retrieval information according to the retrieval information specifying data, an information retrieving server communicating unit communicating with the information retrieving server to obtain the retrieval information, and a retrieval information storage unit storing the obtained retrieval information;

said advertising information obtaining unit comprises:

an advertising information server specifying unit specifying the advertising information server according to the advertising information server specifying data, an advertising information specifying unit specifying the advertising information according to the advertising information specifying data, an advertising information server communicating unit communicating with the advertising information server to obtain the advertising information, and an advertising information storage unit storing the obtained advertising information; and said information converting unit incorporates the advertising information stored by said advertising information storage unit into the retrieval information stored by said retrieval information storage unit.

20. The information retrieving apparatus according to claim 19, wherein said advertising information server communicating unit of said advertising information obtaining unit transmits the information retrieving server specifying data and the retrieval information specifying data to the advertising information server.

21. The information retrieving apparatus according to claim 18, wherein said retrieval condition data includes information retrieving server specifying data specifying the information retrieving server and retrieval information specifying data specifying the retrieval information;

said provided condition data includes advertising information server specifying data specifying the advertising agent server;

said retrieval information obtaining unit comprises:

an information retrieving server specifying unit specifying the information retrieving server according to the information retrieving server specifying data, an retrieval information specifying unit specifying the retrieval information according to the retrieval information specifying data, an information retrieving server communicating unit communicating with the information retrieving server and obtaining the retrieval information, and a retrieval information storage unit storing the obtained retrieval information;

said advertising information obtaining unit comprises:
an advertising information server specifying unit specifying the advertising information server according to the advertising information server specifying data,
an advertising information server communicating unit transmitting the information retrieving server specifying data and the retrieving information specifying data to the advertising information server and obtaining the advertising information from the advertising information server, and
an advertising information storage unit storing the obtained advertising information; and
said information converting unit incorporates the advertising information stored by said advertising information storage unit into the retrieval information stored by said retrieval information storage unit.

22. The information retrieving apparatus according to claim 18, further comprising:
an advertising information use history recording unit recording a use history of the advertising information; and
an advertising information use history communicating unit reading the use history from said advertising information use history recording unit and sending the use history to a device connected to the information communications network.

23. The information retrieving apparatus according to claim 18, wherein
said information communications network is the Internet;
said information retrieving and advertising information servers are WWW servers and connected to the information retrieving apparatus, which is a WWW browser, through the Internet.

24. The information retrieving apparatus according to claim 18, wherein
said advertising information obtaining unit holds the provided condition data, and automatically requests the advertising information server to provide the advertising information when the retrieval condition data is input to said input unit.

25. An advertising information providing apparatus to provide advertising information to an information retrieving apparatus through an information communications network, comprising:
an advertising information data-base unit storing advertising information by assigning a plurality of predetermined tags corresponding to attributes of the advertising information;
a retrieving unit automatically retrieving advertising information stored in said advertising information data-base unit and responsive only to a request for the advertising information transmitted based on a request by the information retrieving apparatus to obtain retrieval information, wherein another predetermined tag is added to the predetermined tags and is derived from the retrieval information, and the automatically retrieved advertising information corresponds to the plurality of predetermined tags including the other predetermined tag;
an advertising information transmitting unit receiving advertising information specifying data for specifying the advertising information from the information retrieving apparatus through the information communications network, and outputting advertising information retrieved by said retrieving unit according to the advertising information specifying data to said information retrieving apparatus, only in response to a request wherein the information retrieving apparatus obtains retrieval information to an information retrieving server through the information communications network;
an information receiver list indicating a list of information retrieving apparatuses to which said advertising information providing apparatus transmits advertising information through the information communications network; and
an advertising information use history recording unit storing a use history of advertising information for each of the information retrieving apparatuses recorded on said information receiver list, wherein
said advertising information transmitting unit receives the use history of the advertising information from an information retrieving apparatus recorded on said information receiver list, and records the use history on said advertising information use history recording unit.

26. The advertising information providing apparatus according to claim 25, wherein
said advertising information specifying data is attribute information of a user of said information retrieving apparatus.

27. The advertising information providing apparatus according to claim 25, wherein
said advertising information transmitting unit comprises:
a communicating unit communicating with said information retrieving apparatus;
an advertising information specifying unit storing the advertising information specifying data received from said information retrieving apparatus through said communicating unit; and
an advertising information storage unit storing advertising information retrieved from said advertising information data-base unit by said retrieving unit.

28. The advertising information providing apparatus according to claim 27, wherein
said advertising information transmitting unit further comprises:
an information retrieving server holding unit storing information retrieving server specifying data received from said information retrieving apparatus to specify an information retrieving server connected to the information communications network, and to specify the information retrieving server according to the information retrieving server specifying data;
a retrieval information holding unit storing retrieval information specifying data received from said information retrieving apparatus to specify specifying retrieval information from the information retrieving server, and to specify the retrieval information according to the retrieval information specifying data; and
a retrieval information storage unit storing the retrieval information obtained from the information retrieving server according to the information retrieving server specifying data and the retrieval information specifying data, wherein
said retrieving unit retrieves from said advertising information data-base unit based on the advertising information specifying data stored in said advertising information specifying unit and the retrieval information stored in said retrieval information storage unit, and stores retrieved advertising information in said advertising information storage unit.

29. The advertising information providing apparatus according to claim 28, wherein
said information communications network is the Internet;
said information retrieving apparatus is a WWW browser;
said information retrieving server is a WWW server; and
said WWW browser and said WWW server are connected to said advertising information providing apparatus through the Internet.

* * * * *

UNITED STATES PATENT AND TRADEMARK OFFICE
CERTIFICATE OF CORRECTION

| | | |
|---|---|---|
| PATENT NO. | : 7,136,853 B1 | |
| APPLICATION NO. | : 08/708981 | |
| DATED | : November 14, 2006 | |
| INVENTOR(S) | : Youji Kohda et al. | |

It is certified that error appears in the above-identified patent and that said Letters Patent is hereby corrected as shown below:

Column 40, Line 36, after "data" delete "such that".

Signed and Sealed this

Thirteenth Day of March, 2007

JON W. DUDAS
*Director of the United States Patent and Trademark Office*